US009657696B2

(12) United States Patent
Guidry et al.

(10) Patent No.: US 9,657,696 B2
(45) Date of Patent: May 23, 2017

(54) EXCESS POWER DISSIPATION FOR THROTTLE LOSS RECOVERY SYSTEMS

(71) Applicant: HONEYWELL INTERNATIONAL INC., Morristown, NJ (US)

(72) Inventors: Mike Guidry, Redondo Beach, CA (US); Patrick Beresewicz, La Mirada, CA (US); Andrew Love, Lorraine (FR)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 82 days.

(21) Appl. No.: 14/827,791

(22) Filed: Aug. 17, 2015

(65) Prior Publication Data

US 2016/0258394 A1 Sep. 8, 2016

Related U.S. Application Data

(60) Provisional application No. 62/128,093, filed on Mar. 4, 2015.

(51) Int. Cl.
*F02D 41/00* (2006.01)
*F02M 35/10* (2006.01)
(Continued)

(52) U.S. Cl.
CPC ..... *F02M 35/10019* (2013.01); *F02M 35/10249* (2013.01); *H02K 7/1823* (2013.01); *F02D 9/1055* (2013.01)

(58) Field of Classification Search
CPC .... F02D 31/003; F02D 31/005; F02D 41/086; H02K 7/18
(Continued)

(56) References Cited

U.S. PATENT DOCUMENTS 5,394,848 A  *  3/1995  Tsutsumi ................. F02D 9/02
                                                  123/361
6,145,314 A     11/2000  Woollenweber
                          (Continued)

FOREIGN PATENT DOCUMENTS

DE    102013213435 A1    1/2015
EP         2067960 A1    6/2009
                (Continued)

OTHER PUBLICATIONS

Extended EP Search Report for Application No. 16156403A-1603 dated Jul. 22, 2016.
(Continued)

*Primary Examiner* — John Kwon
(74) *Attorney, Agent, or Firm* — Lorenz & Kopf, LLP

(57) ABSTRACT

Systems and methods are provided for managing excess electrical energy generated by a throttle loss recovery system. One exemplary system includes a flow control assembly to generate electrical energy in response to a portion of a fluid flow bypassing a flow control valve, an electrical system coupled to the flow control assembly to receive the electrical energy, and a control module coupled to the electrical system. The electrical system includes an energy storage element and an electrical load. The control module detects an excess energy condition based at least in part on a characteristic of the electrical system, and in response, operates the electrical system to dissipate at least a portion of the electrical energy generated by the flow control assembly using the electrical load.

20 Claims, 7 Drawing Sheets

(51) Int. Cl.
*H02K 7/18* (2006.01)
*F02D 9/10* (2006.01)

(58) Field of Classification Search
USPC ........ 123/361, 339.23, 339.22; 60/396, 397; 290/52
IPC ....................................................... H02K 7/18
See application file for complete search history.

(56) References Cited

U.S. PATENT DOCUMENTS

| | | | |
|---|---|---|---|
| 8,446,029 | B2 | 5/2013 | Smith et al. |
| 8,544,262 | B2 | 10/2013 | Reyenga et al. |
| 2001/0036062 | A1 | 11/2001 | Daly et al. |
| 2009/0229898 | A1* | 9/2009 | Fujino ................. B60L 7/24 180/65.29 |
| 2009/0288577 | A1* | 11/2009 | Kumar .................. B60L 11/02 105/36 |
| 2011/0241344 | A1 | 10/2011 | Smith et al. |
| 2011/0265882 | A1 | 11/2011 | Reyenga et al. |
| 2011/0271936 | A1 | 11/2011 | Reyenga et al. |
| 2013/0091844 | A1 | 4/2013 | Leone et al. |
| 2014/0261250 | A1 | 9/2014 | Katayama et al. |
| 2015/0040860 | A1 | 2/2015 | Reyenga et al. |
| 2015/0167467 | A1 | 6/2015 | Reyenga et al. |
| 2016/0179116 | A1* | 6/2016 | Bacque .................. G05F 1/625 700/298 |
| 2016/0258312 | A1* | 9/2016 | Love ....................... F01D 15/10 |
| 2016/0258314 | A1* | 9/2016 | Love ............... F02M 35/10019 |
| 2016/0258394 | A1* | 9/2016 | Guidry ............ F02M 35/10019 |

FOREIGN PATENT DOCUMENTS

| | | |
|---|---|---|
| EP | 3064749 A1 | 9/2016 |
| JP | S6172859 A | 4/1986 |
| JP | H0681668 A | 3/1994 |
| JP | 2000130176 A | 5/2000 |
| WO | 9604487 A1 | 2/1996 |
| WO | 2011139725 A2 | 11/2011 |
| WO | 2011156056 A2 | 12/2011 |
| WO | 2012151383 A1 | 11/2012 |
| WO | 2013163128 A1 | 10/2013 |

OTHER PUBLICATIONS

Extended EP Search Report for Application No. 16156405.9-1603 dated Jul. 21, 2016.
Extended EP Search Report for Application No. 16183647.3-1603 dated Dec. 16, 2016.
Thompson F., et al.; Generator Temperature Management for Throttle Loss Recovery Systems, U.S. Appl. No. 14/638,232, filed Mar. 4, 2015.
USPTO Office Action for U.S. Appl. No. 14/638,232 dated Jan. 19, 2017.
USPTO Restriction Requirement for U.S. Appl. No. 14/827,828 dated Jan. 26, 2017.
Extended EP Search Report for Application No. 16183871.9-1603 dated Jan. 19, 2017.

* cited by examiner

EXCESS POWER DISSIPATION FOR THROTTLE LOSS RECOVERY SYSTEMS

CROSS-REFERENCE TO RELATED APPLICATION(S)

This application claims the benefit of U.S. provisional patent application Ser. No. 62/128,093, filed Mar. 4, 2015, the entire content of which is incorporated by reference herein. The subject matter described herein is also related to the subject matter described in U.S. patent application Ser. No. 14/827,746 and U.S. patent application Ser. No. 14/827,828, both filed concurrently herewith.

TECHNICAL FIELD

The subject matter described herein relates generally to flow control systems, and more particularly, to managing excess recovered electrical power in a throttle loss recovery system.

BACKGROUND

The throttling of intake air is a known way of controlling the output of an engine, such as an internal combustion engine. Often, internal combustion engines use throttle bodies to throttle the intake air to the desired flow rate. However, the throttling of air may cause a loss in efficiency during partial throttle conditions. Specifically, throttle bodies in some embodiments use butterfly valves to throttle the flow of intake air. While butterfly valves are known for their simplicity and reliability, they provide the throttling function by constricting the air intake path to a smaller area, which creates flow losses.

Prior art solutions have been developed which seek to control the flow of intake air while recovering some of the energy lost in the throttling process. Some of these prior art solutions recover energy using mechanical means, while others recover energy electrically. In those situations, the recovered electrical energy may exceed the demands of the vehicle electrical system, in which case, the excess electrical energy must be dissipated. One approach to dissipating the excess energy involves short-circuiting the generator stator coils to regulate the electrical power output, however, this may cause current ripple or electrical noise that can be detrimental to other electrical components. Additionally, short-circuiting the excess energy may result in relatively high current, which, in turn, generates heat. This excess heat also must be dissipated to prevent component overheating; however, since the throttle loss recovery system is typically under the hood of a vehicle where temperatures may already be elevated, dissipating excess electrical energy in a manner that produces heat under the hood of the vehicle merely exacerbates another problem.

BRIEF SUMMARY

Turbine assemblies, throttle loss recovery systems, and related vehicle systems and operating methods are provided.

One exemplary system includes a flow control assembly, a conduit providing fluid communication with the flow control assembly for a bypass portion of a fluid flow that bypasses a flow control valve based on an orientation of the flow control valve with respect to the fluid flow, and an electronics assembly including an electronics module coupled to the flow control assembly, wherein at least a portion of the electronics assembly is in fluid communication with the bypass portion of the fluid flow.

One exemplary throttle loss recovery system includes an inlet conduit upstream of a throttle, a turbine assembly coupled to the inlet conduit to receive an input fluid flow via the inlet conduit based on an orientation of the throttle, an outlet conduit downstream of the throttle that is coupled to the turbine assembly to receive an output fluid flow from the turbine assembly, and an electronics assembly including an electronics module coupled to the turbine assembly to control operations of the turbine assembly, wherein at least a portion of the electronics assembly is in fluid communication with at least one of the input fluid flow and the output fluid flow.

An exemplary method of operating a turbine assembly involves operating the turbine assembly to generate electrical energy in response to a bypass fluid flow to the turbine assembly, monitoring a first temperature corresponding to an intake fluid flow downstream of the turbine assembly, and automatically adjusting operation of the turbine assembly to increase the first temperature when the first temperature is less than a threshold. The bypass fluid flow is influenced by an orientation of a flow control valve.

In yet another embodiment, an exemplary system includes a flow control assembly to generate electrical energy in response to a bypass portion of a fluid flow bypassing a flow control valve based on an orientation of the flow control valve with respect to the fluid flow, an electrical system comprising an energy storage element and an electrical load is coupled to the flow control assembly to receive the electrical energy, and a control module coupled to the electrical system to detect an excess energy condition based at least in part on a characteristic of the electrical system, and to operate the electrical system to dissipate at least a portion of the electrical energy generated by the flow control assembly using the electrical load in response to the excess energy condition.

An exemplary vehicle system includes a turbine assembly upstream of a throttle to generate electrical energy at an output in response to an input fluid flow influenced by an orientation of the throttle, a vehicle electrical system including an energy storage element and a vehicle electrical component that is coupled to the output of the turbine assembly, and a control module coupled to the vehicle electrical system to identify an excess energy condition and automatically activate the vehicle electrical component to dissipate at least a portion of the electrical energy generated by the turbine assembly in response to the excess energy condition.

In yet another embodiment, a method of managing electrical energy generated by a turbine assembly upstream of a throttle is provided. The turbine assembly generates the electrical energy in response to a fluid flow influenced by an orientation of the throttle. The method involves operating a vehicle electrical system coupled to the turbine assembly to deliver the electrical energy to an energy storage element, operating the vehicle electrical system to dissipate at least a portion of the electrical energy using a vehicle electrical component in response to an excess energy condition, and thereafter operating the vehicle electrical system to deliver the electrical energy to the energy storage element in response to an absence of the excess energy condition.

In another embodiment, a method of operating a flow control assembly generating electrical energy in response to a bypass fluid flow influenced by an orientation of a flow control valve involves operating the flow control assembly to deliver the electrical energy to a vehicle electrical system, and in response to a low temperature condition, automatically adjusting operation to alter heat generation at the flow control assembly, for example, by adjusting the delivery of the electrical energy to increase heat generation.

An embodiment of operating a turbine assembly generating electrical energy in response to a bypass fluid flow influenced by an orientation of a flow control valve involves operating the turbine assembly to deliver the electrical energy to a vehicle electrical system and monitoring a temperature associated with the turbine assembly. Operation of the turbine assembly is automatically adjusted to dissipate at least a portion of the electrical energy when the temperature is less than a threshold.

Another method of operating a throttle loss recovery assembly generating electrical energy in response to a bypass fluid flow influenced by an orientation of a throttle with respect to an intake fluid flow involves operating the throttle loss recovery assembly to deliver the electrical energy to a vehicle electrical system, detecting a potential icing condition, and automatically adjusting operation of the throttle loss recovery assembly to dissipate at least a portion of the electrical energy in a manner that increases generation of heat at the throttle loss recovery assembly in response to detecting the potential icing condition.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein relate to vehicle systems that include a flow control assembly that functions as a bypass for fluid flow around a flow control valve to generate energy from the bypassing fluid flow. For purposes of explanation, the subject matter is described herein in the context of a turbine assembly that functions as a bypass for a throttle and includes an electrical generator that generates electrical energy, which offsets or otherwise compensates for losses or other inefficiencies resulting from throttling the intake air. However, it should be appreciated that the subject matter described herein is not limited to use with turbines or throttles, and may be implemented in an equivalent manner for other suitable mechanical devices or flow control assemblies that are arranged to provide a bypass for another suitable flow control valve. Additionally, while the subject matter is described herein in the context of a the turbine assembly being configured as a turbo generator, the subject matter described herein is not limited to use with turbo generators and may be implemented in an equivalent manner for turbochargers or other suitable arrangements.

Figure 3:
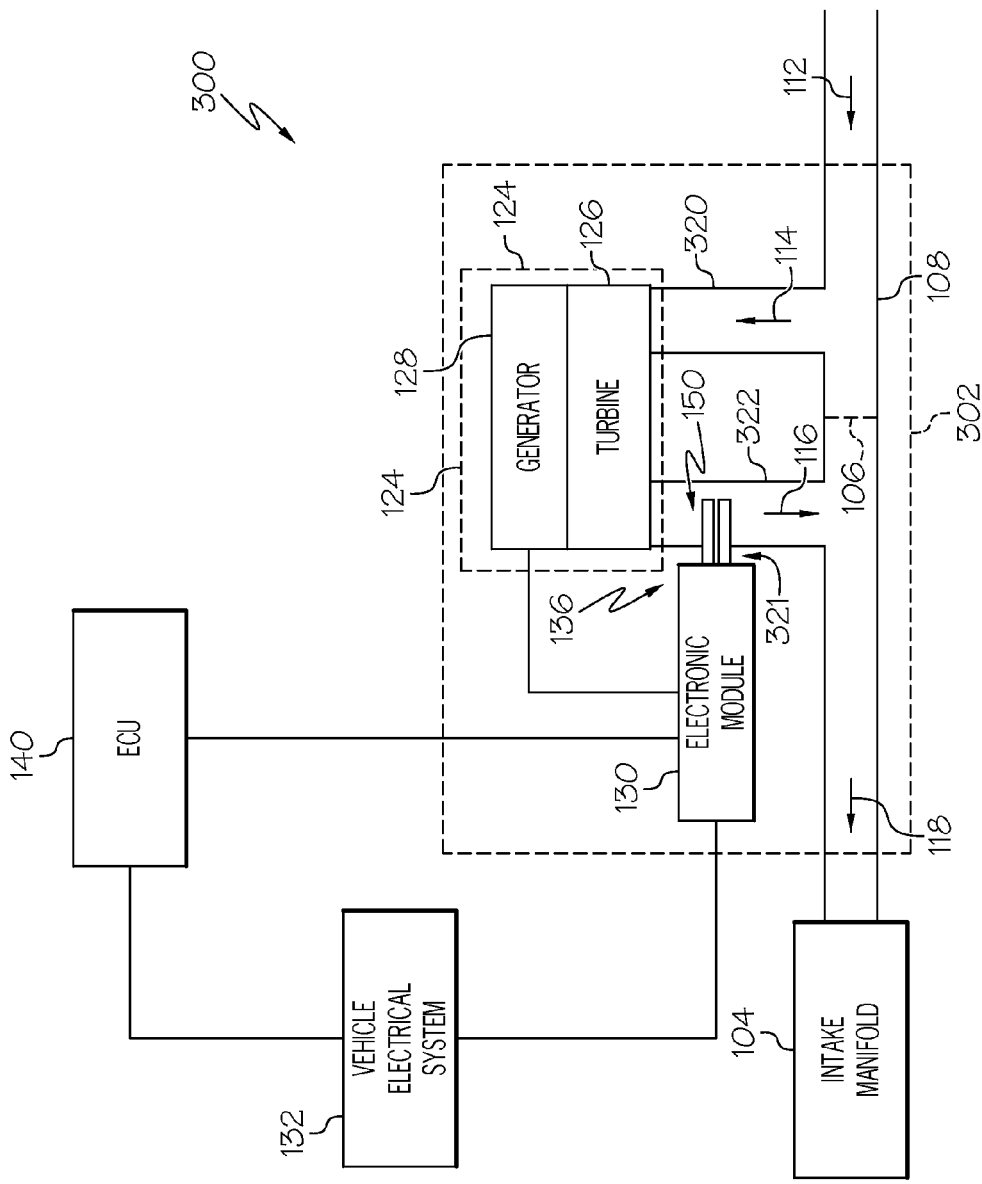
FIG. 3 is a block diagram of another embodiment of a vehicle system including a throttle loss recovery system in one or more exemplary embodiments.

In one or more exemplary embodiments described herein, the electronics associated with the turbine assembly are thermally coupled to air bypassing the throttle, by establishing fluid communication between the electronics assembly and the bypass air either upstream of the turbine (FIG. 1) or downstream of the turbine (FIG. 3). In this manner, the electronics may be packaged under the hood and cooled by the air bypassing the throttle, which typically has a colder temperature than the external under the hood temperatures near the turbine assembly. In embodiments where the electronics assembly is upstream of the turbine, the heat transfer between the electronics assembly and the bypass air raises the temperature of the air that is input to the turbine, which, in turn, increases the available energy that may be produced by the turbine. Additionally, raising the temperature of the bypass air reduces the risks of icing downstream of the turbine assembly. In embodiments where the electronics assembly is downstream of the turbine, the temperature of the bypass air at the turbine outlet is colder relative to the inlet of the turbine, and thus, facilitates more effective cooling of the electronics assembly. The risk of icing may also be further reduced by providing the heat transfer downstream of the turbine.

By virtue of the cooling of the electronics by the bypass air, excess electrical energy generated by the turbine assembly may be dissipated at the electronics assembly without exceeding maximum operating temperatures of the electronics. For example, when the power output by the generator cannot be transferred to available energy storage devices (e.g., a battery, capacitor, or the like) or other electrical components within the vehicle system, the excess electrical energy may be dissipated by the electronics at the electronics assembly, thereby generating heat at the electronics assembly that is dissipated by the bypass air. In some embodiments, the heat dissipated by the electronics at the electronics assembly may be dynamically varied or adjusted to achieve a desired temperature at the inlet to the turbine, at the outlet of the turbine, at the intake manifold, or the like. For example, electrical energy generated by the generator may be selectively dissipated by the electronics at the electronics assembly rather than being transferred to the vehicle electrical system to achieve a desired operating temperature for the turbine assembly, the engine, or the like. In one or more embodiments, the temperature of the air downstream of the turbine that influences or otherwise corresponds to the temperature of the engine intake air is monitored, and the operation of the turbine assembly is automatically adjusted to increase the temperature of the engine intake air when the measured downstream air temperature is less than a threshold temperature. In this regard, additional heat may be dissipated at the electronics assembly and/or operations of the turbine assembly may be dynamically adjusted in conjunction with the heat dissipated at the electronics assembly to regulate the engine intake air to a desired operating temperature.

Figure 1:
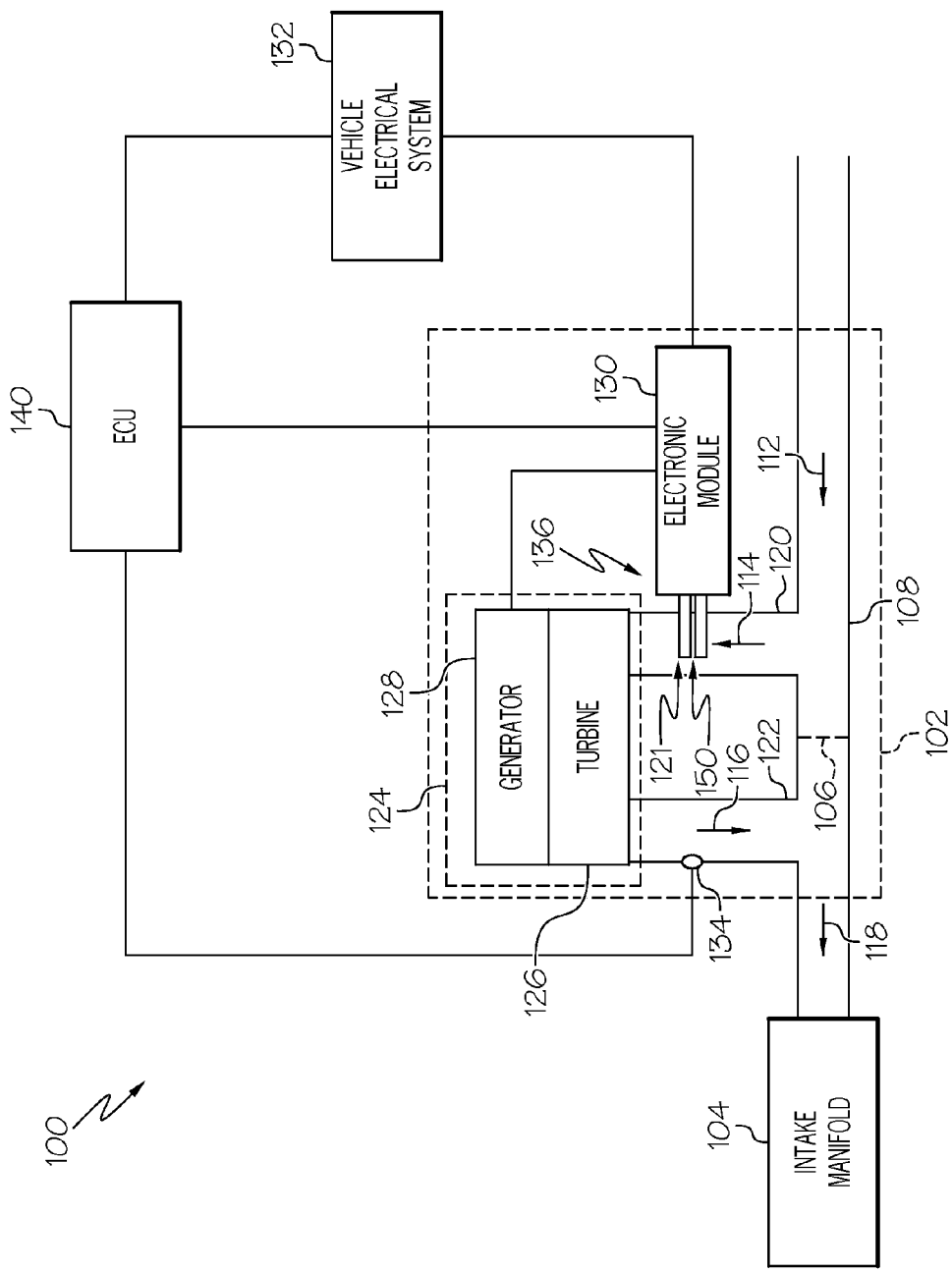
FIG. 1 is a block diagram of a vehicle system including a throttle loss recovery system in one or more exemplary embodiments.

FIG. 1 depicts an exemplary embodiment of a vehicle system 100 that includes a throttle loss recovery (TLR) assembly 102 configured to modulate the flow of fluid to an intake manifold 104 of an engine. The TLR assembly 102 includes a throttle 106 disposed within a conduit 108 for fluid 112 to be supplied to the engine intake. In some embodiments, the fluid 112 is realized as ambient air received via a port or inlet upstream of the TLR assembly 102. In other embodiments, the fluid 112 is realized as cooled charge air from the output of a charge air cooler (or intercooler). In this regard, the input fluid flow 112 may include compressed air.

The TLR assembly 102 includes a conduit 120 that adjoins the engine intake conduit 108 upstream of the throttle 106 and has an inlet configured to selectively receive at least a portion 114 of the input fluid flow 112 in a manner that is influenced by the orientation (or angle) of the throttle 106 with respect to the input fluid flow 112. In this regard, as the angle of the throttle 106 with respect to the input fluid flow 112 increases to restrict the amount of the input fluid flow 112 that passes the throttle 106 to the intake manifold 104, the amount of fluid flow 114 bypassing the throttle 106 through the conduit 120 increases, which, in turn, increases the potential electrical energy that may be generated by the turbine assembly 124. Conversely, as the angle of the throttle 106 with respect to the input fluid flow 112 decreases to allow more of the input fluid flow 112 to pass the throttle 106 to the intake manifold 104, the amount of bypass fluid flow 114 entering the conduit 120 decreases.

The outlet of the conduit 120 is coupled to the inlet (or input) of a turbine assembly 124 to establish fluid communication between the intake conduit 108 upstream of the throttle 106 and the inlet of a turbine 126 of the turbine assembly 124. In this regard, the bypass fluid flow 114 functions as the turbine input fluid flow that passes through the volute, nozzle, or and/or vanes of the turbine 126 and impacts the blades (or wheel) of the turbine 126 to rotate the turbine 126. In the illustrated embodiment, the turbine assembly 124 includes an electrical generator 128 coupled to the turbine 126 via a shaft, and the electrical generator 128 generates electrical energy in response to the rotation of the shaft caused by the turbine input fluid flow 114. The TLR assembly 102 includes another conduit 122 having an inlet coupled to the outlet of the turbine 126 and an outlet coupled to the intake conduit 108 downstream of the throttle 106 to establish fluid communication between the turbine 126 and the intake conduit 108 for the turbine output fluid flow 116. The turbine output fluid flow 116 combines with whatever portion of the input fluid flow 112 passes the throttle 106 to provide the intake fluid flow 118 supplied to the intake manifold 104. In this regard, the temperature of the intake fluid flow 118 may be influenced by or otherwise correspond to (or correlate to) the temperature of the turbine output fluid flow 116 when the throttle 106 is oriented to restrict at least a portion of the input fluid flow 112.

Figure 2:
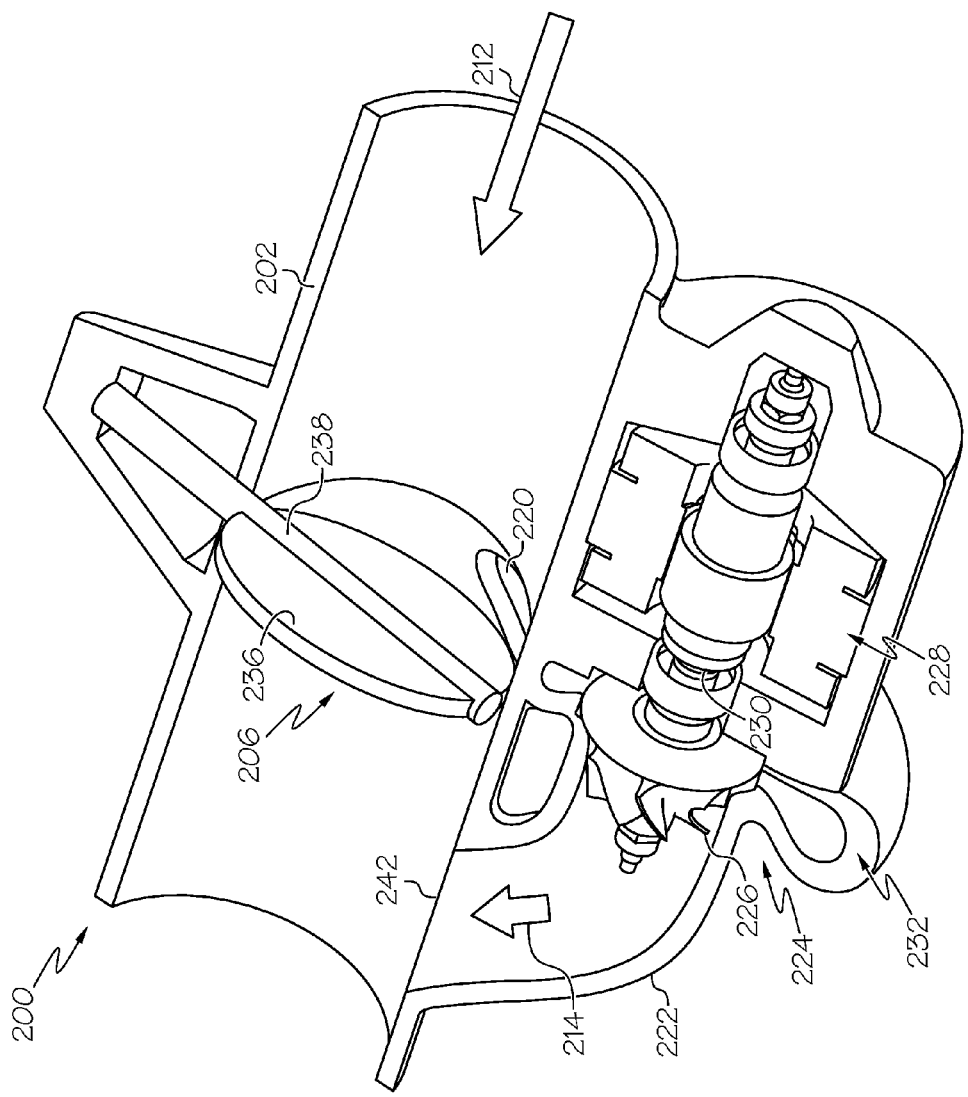
FIG. 2 is a cross-sectional view of a throttle loss recovery system suitable for use in the vehicle system of FIG. 1 in an exemplary embodiment.

FIG. 2 depicts a cross-sectional view of an exemplary embodiment of a TLR assembly 200 suitable for use as the TLR assembly 102 in the vehicle system 100 of FIG. 1. The TLR assembly 200 includes a fluid conduit 202 which is configured to receive flow 212 of an input fluid (e.g., input fluid flow 112) and a throttle 206, is positioned in the fluid conduit 202. In the illustrated embodiment, the turbine inlet conduit includes an inlet 220 which may be defined at least in part by the intake conduit 202 and configured to selectively receive at least a portion of the input fluid flow 212 from the intake conduit 202. The turbine wheel 226 is mounted on a shaft 230 coupled to an electrical generator 228, which is configured to produce electrical energy when the turbine wheel 226 rotates. The illustrated turbine assembly 224 includes a volute 232, which substantially surrounds the turbine 226 and supplies the portion of the input fluid flow 212 received via the inlet 220 to the turbine 226. As illustrated, in some embodiments, the intake conduit 202, the turbine outlet conduit 222, and the volute 232 may be defined by an integral housing, which also retains the turbine 226 and the generator 228 to provide the TLR assembly 200 with a relatively compact form.

In exemplary embodiments, the throttle 206 is configurable between multiple positions. For instance, in some embodiments, the throttle 206 is realized as a butterfly valve that includes a throttle plate 236. An adjustment mechanism such as an electric motor or throttle cable may be configured to control the throttle 206 by adjusting the position of the throttle plate 236, for example, by rotating a shaft 238 to which the throttle plate 236 is coupled about its longitudinal axis. In practice, a position sensor may detect the position of the throttle plate 236 or the shaft 238 and provide feedback as to the position of the throttle plate 236 such that the position of the throttle 206 may be adjusted to achieve a desired intake fluid flow downstream of the throttle 206. In this regard, FIG. 2 depicts the throttle 206 opened to a point at which the inlet 220 to the turbine 226 is substantially fully unblocked. Thus, the turbine assembly 224 acts as a bypass around the throttle 206 when at least a portion of the inlet 220 is not obstructed by the throttle plate 236. At least a portion of the input fluid flow 212 enters the volute 232 via the inlet 220, which feeds the turbine 226, and the turbine output fluid flow 214 exiting the turbine 226 passes through the turbine outlet conduit 222 and reenters the intake conduit 202 downstream of the throttle 206 via an outlet 242. As illustrated, the outlet 242 may be defined by an opening in the sidewall of the intake conduit 202 downstream of the throttle 206. It will be appreciated that the orientation of the throttle plate 236 with respect to the input fluid flow 212 will vary during operation, which, in turn, will vary the amount of the input fluid flow 212 that is redirected or otherwise bypasses the throttle via the turbine assembly 224.

Referring again to FIG. 1, the vehicle system 100 includes an electronics assembly 136 that includes an electronics module 130 that is coupled between the generator 128 and the vehicle electrical system 132. The electronics module 130 includes the electrical elements or components that are configured to receive the electrical energy generated by the generator 128 and provide an interface between the output of the generator 128 and the vehicle electrical system 132 for delivering the generated electrical energy to the vehicle electrical system 132. For example, the electronics module 130 may include a rectifier coupled to a voltage bus associated with the vehicle electrical system 132 to rectify the output of the generator 128 to a direct current voltage level corresponding to the voltage bus. Additionally, in some embodiments, the electronics module 130 may include resistors, capacitors, inductors, diodes, transistors, and/or other electrical circuit elements configured to dissipate at least a portion of the electrical energy generated by the generator 128. In exemplary embodiments, the electronics module 130 is capable of varying the voltage output provided to the vehicle electrical system 132 by dissipating at least a portion of the electrical energy generated by the generator 128 at the electronics module 130. In this regard, the electronics module 130 may include a silicon controller rectifier, switching arrangement, or other electrical component that may be operated to dissipate electrical energy at the electronics module 130 to maintain the output voltage provided to the vehicle electrical system 132 at a target voltage set point provided by the ECU 140. For example, the electronics module 130 may include a field-effect transistor (FET) configured parallel to the generator output that is pulsed, switched, or otherwise activated with a duty cycle that results in the FET dissipating a portion of the generated electrical energy that results in the voltage output by the rectifier of the electronics module 130 being substantially equal to the target voltage set point from the ECU 140.

In one or more exemplary embodiments, the electronics module 130 also includes a control module that is configured to control operations of the turbine assembly 124, for example, by varying the amount of energy (or heat) dissipated at the electronics module 130, varying the geometry of the turbine 126 (e.g., in the case of a variable geometry turbine), varying the amount (or portion) of the generated electrical energy that is output to the vehicle electrical system 132, and the like. In this regard, the control module of the electronics module 130 may be coupled to the engine control unit (ECU) 140 and configured to support the thermal regulation processes described herein. Depending on the embodiment, the control module of the electronics module 130 may be implemented or realized with a general purpose processor, a controller, a microprocessor, a microcontroller, an application specific integrated circuit, a field programmable gate array, any suitable programmable logic device, discrete gate or transistor logic, processing core, discrete hardware components, or any combination thereof designed to perform the functions described herein. Furthermore, the steps of a method or algorithm described in connection with the embodiments described herein may be embodied directly in hardware, in firmware, in a software module executed by the control module, or in any practical combination thereof. In this regard, the electronics module 130 may include a data storage element, such as a memory, one or more registers, or another suitable non-transitory short or long term computer-readable storage media, which is capable of storing computer-executable programming instructions or other data for execution that, when read and executed by the control module, cause the control module to execute and perform one or more of the processes tasks, operations, and/or functions described herein.

Still referring to FIG. 1, at least a portion of the electronics assembly 136 is in fluid communication with the turbine input fluid flow 114 within the turbine inlet conduit 120. In this regard, the electronics assembly 136 may include one or more heat exchange elements 150, with the turbine inlet conduit 120 including an opening or port 121 in a sidewall of the conduit 120 that is adapted to receive at least a portion of the heat exchange element 150 that protrudes through the sidewall opening 121. The heat exchange element 150 is thermally coupled to the electronics module 130 and configured to transfer thermal energy from the electronics module 130 to the turbine input fluid flow 114. For example, the heat exchange element 150 may be realized as a heat sink that is directly mounted to the electronics module 130 for direct heat transfer between the electronics module 130 and the heat exchange element 150. Alternatively, the heat exchange element 150 and the electronics module 130 are mounted to a common substrate that facilitates indirect heat transfer between the electronics module 130 and the heat exchange element 150 via the substrate.

By virtue of the fluid communication between the turbine input fluid flow 114 and the heat exchange element 150, at least a portion of the electronics assembly 136 is thermally coupled to the turbine input fluid flow 114. In exemplary embodiments, the input fluid flow 112 is realized as ambient air having an ambient temperature that is typically less than the temperatures under the hood of the vehicle surrounding where the turbine assembly 124 and the electronics assembly 136 are mounted, such that the bypass portion 114 of the ambient air in fluid communication with the heat exchange element 150 dissipates heat (or thermal energy) from the electronics module 130 via thermal communication between the ambient fluid flow 114 and the electronics module 130 provided by the heat exchange element 150. While FIG. 1 depicts the electronics assembly 136 and the turbine assembly 124 as separate components of the vehicle system 100, in practice, the electronics assembly 136 may be integrated with the turbine assembly 124 as a unitary component or otherwise packaged together within the vehicle. Furthermore, the electronics assembly 136 and the turbine assembly 124 may be integrated with the throttle 106, the bypass conduits 120, 122 and the portion of the intake conduit 108 the throttle 106 is disposed within to provide a unitary TLR assembly 102, as depicted in FIG. 2. In this regard, the electronics assembly 136 may physically contact (either directly or indirectly) one or more components of the TLR assembly 102. Thus, dissipating electrical energy at the electronics assembly 136 may also increase the temperature of the throttle plate 206 and/or the housing of the TLR assembly 200 packaged with the electronics assembly 136 via thermal conduction, thereby reducing the likelihood of icing at the throttle 106, 206. Further examples of how the electronics assembly 136 may be packaged or otherwise integrated with the housing of a TLR assembly 102, 200 are described in U.S. patent application Ser. No. 14/638,232.

Still referring to FIG. 1, it should be noted that not only does the thermal communication between the electronics assembly 136 and the turbine input fluid flow 114 decrease the temperature of the electronics module 130, but the heat transfer from the electronics module 130 to the turbine input fluid flow 114 also raises the temperature of the turbine input fluid flow 114. This, in turn, increases the potential temperature differential across the turbine 126 (e.g., the difference between the temperature of the turbine input fluid flow 114 and the temperature of the turbine output fluid flow 116), which increases the amount of energy that may be generated by the turbine assembly 124. Additionally, raising the turbine input fluid flow 114 temperature also allows for the temperature of the turbine output fluid flow 116 to be raised, which, in turn, decreases the potential for icing in the intake manifold 104.

In the illustrated embodiment, the vehicle system 100 further includes one or more temperature sensing elements 134 to measure, sense, or otherwise quantify the temperature of the turbine output fluid flow 116 within the turbine outlet conduit 122 that will be supplied to the intake fluid flow 118. Depending on the embodiment, the temperature sensing element 134 may be mounted or otherwise integrated into the sidewall of the turbine outlet conduit 122, or alternatively, the turbine outlet conduit 122 may include an opening or port adapted to receive the temperature sensing element 134 in a similar manner as described above with respect to the opening 121 in the turbine inlet conduit 120. It should be noted that while FIG. 1 depicts the temperature sensing element 134 measuring the turbine output fluid flow 116, in other embodiments, the temperature sensing element 134 may be relocated and configured to measure the temperature of the input fluid flow 112, the intake fluid flow 118, or the turbine input fluid flow 114, and the subject matter described herein is not limited to any particular location or arrangement of the temperature sensing element 134. In this regard, in some embodiments, the temperature sensing element 134 may be integrated with the electronics assembly 136, as described in greater detail below in the context of FIG. 7.

Referring again to FIG. 1, the output of the temperature sensing element 134 may be coupled to the ECU 140 to provide a measured temperature of the turbine output fluid flow 116 to the ECU 140. In this regard, the ECU 140 may continually monitor the measured temperature of the turbine output fluid flow 116 and identify or otherwise detect when the measured temperature of the turbine output fluid flow 116 falls below a threshold temperature, such as an icing threshold. When the measured temperature of the turbine output fluid flow 116 is less than the threshold, the ECU 140 may signal, command, or otherwise instruct the electronics module 130 to dissipate energy and increase the temperature of the turbine input fluid flow 114. The ECU 140 may signal the control module of the electronics module 130 to operate the electronics module 130 to dissipate more electrical energy generated by the generator 128, and thereby increase the temperature of the turbine input fluid flow 114 via the heat exchange element 150 in lieu of providing the generated electrical energy to the vehicle electrical system 132. For example, the electronics module 130 may include one or more switched resistors, which may be operated by the control module of the electronics module 130 to increase the heat dissipation at the electronics module 130, which, in turn, is transferred to the turbine input fluid flow 114 via the heat exchange element 150. In this manner, the likelihood of icing within TLR assembly 102 and/or the intake fluid flow 118 may be reduced (if not eliminated) by monitoring the temperature of the turbine output fluid flow 116 and dynamically adjusting the temperature of the turbine input fluid flow 114 as needed to maintain the temperature of the turbine output fluid flow 116 above an icing threshold. Thereafter, once the measured temperature of the turbine output fluid flow 116 is great enough, the ECU 140 may signal, command, or otherwise instruct the control module of the electronics module 130 to resume normal operation and cease operating the electronics module 130 to dissipate electrical energy solely for the purpose of increasing the temperature of the turbine input fluid flow 114.

It will be appreciated that there are numerous potential combinations or configurations of operations of one or more of the turbine 126, the generator 128, the electronics module 130, and the vehicle electrical system 132 to increase the heat dissipated at the electronics module 130 to raise the temperature of the turbine input fluid flow 114, and the subject matter described herein is not intended to be limited to any particular manner of regulating the temperature of the turbine input fluid flow 114. For example, in various alternative embodiments, the control module of the electronics module 130 may be configured to increase the heat dissipated at the TLR assembly 102 by varying the loading on the generator 128, varying the power provided by the turbine assembly 104 (e.g., by varying the turbine geometry in the case of a variable geometry turbine 126) or the like. That said, in one or more exemplary embodiments, the turbine 126 has a fixed geometry and the generator 128 is matched with the turbine 126 to produce a desired power and/or voltage output over an efficient range of speeds for the turbine 126. For example, in an automotive vehicle, the generator 128 may be designed to produce an output voltage in the range of about 12 Volts to about 15 Volts when loaded by the vehicle electrical system and operating at the range of rotational speeds that the turbine 126 is likely to exhibit during vehicle operating conditions (e.g., when the throttle 106 is mostly closed or only partially open) where the turbine assembly 124 can be utilized to recharge the vehicle battery or operate other components of the vehicle electrical system. However, in embodiments where a variable geometry turbine is utilized, the ECU 140 may command, signal, or otherwise instruct the control module of the electronics module 130 to operate the turbine 126 (e.g., by varying the geometry) to decrease the temperature differential across the turbine 126, and thereby raise the temperature of the turbine output fluid flow 116 in conjunction with the heat dissipation by the heat exchange element 150.

Moreover, it should be noted that while FIG. 1 depicts the output of the temperature sensing element 134 being coupled to the ECU 140, in alternative embodiments, the temperature sensing element 134 may be coupled to the electronics module 130 to provide the measured temperature of the turbine output fluid flow 116 to the control module of the electronics module 130, which, in turn, determines how to regulate the temperature of the turbine input fluid flow 114 independent of the ECU 140. Furthermore, in other embodiments, the temperature sensing element 134 (or an additional sensing element 134) may be configured to obtain the measured temperature for the intake fluid flow 118 in lieu of (or in addition to) the temperature of the turbine output fluid flow 116, with the ECU 140 and/or the electronics module 130 increasing the heat dissipation at the electronics module 130 to raise the temperature of the turbine input fluid flow 114 in a manner that is influenced by the measured temperature of the intake fluid flow 118 going to the intake manifold 104. Additionally, in yet other embodiments, the electronics assembly 136 may be in fluid communication with the input fluid flow 112 upstream of the turbine inlet conduit 120 and the throttle 106 at other locations within the TLR assembly 102, for example, by providing an opening for the heat exchange elements 150 in the intake conduit 108 upstream of both the turbine inlet conduit 120 and the throttle 106 in lieu of the opening 121 in the turbine inlet conduit 120.

FIG. 3 depicts another embodiment of a vehicle system 300 that includes a TLR assembly 302 configured to modulate the flow of fluid to an intake manifold 104 of an engine. In contrast to the TLR assembly 102 of FIG. 1, the TLR assembly 302 is configured so that the electronics assembly 136 is in fluid communication with the turbine output fluid flow 116 within the turbine outlet conduit 322. In this regard, the turbine outlet conduit 322 includes an opening or port 321 adapted to receive at least a portion of the heat exchange element 150 that is in thermal communication with the electronics module 130 and protrudes through the opening 321 to transfer thermal energy from/to the electronics module 130 to/from the turbine output fluid flow 116. By virtue of the temperature drop across the turbine 126, the temperature of the turbine output fluid flow 116 is less than the temperature of the turbine input fluid flow 114 within the turbine inlet conduit 320, and therefore, the electronics module 130 may be more effectively cooled by the TLR assembly 302 of FIG. 3. The heat transfer from the electronics module 130 to the turbine output fluid flow 116 also increases the temperature of the turbine output fluid flow 116 and decreases the potential for icing in the intake manifold 104.

Figure 4:
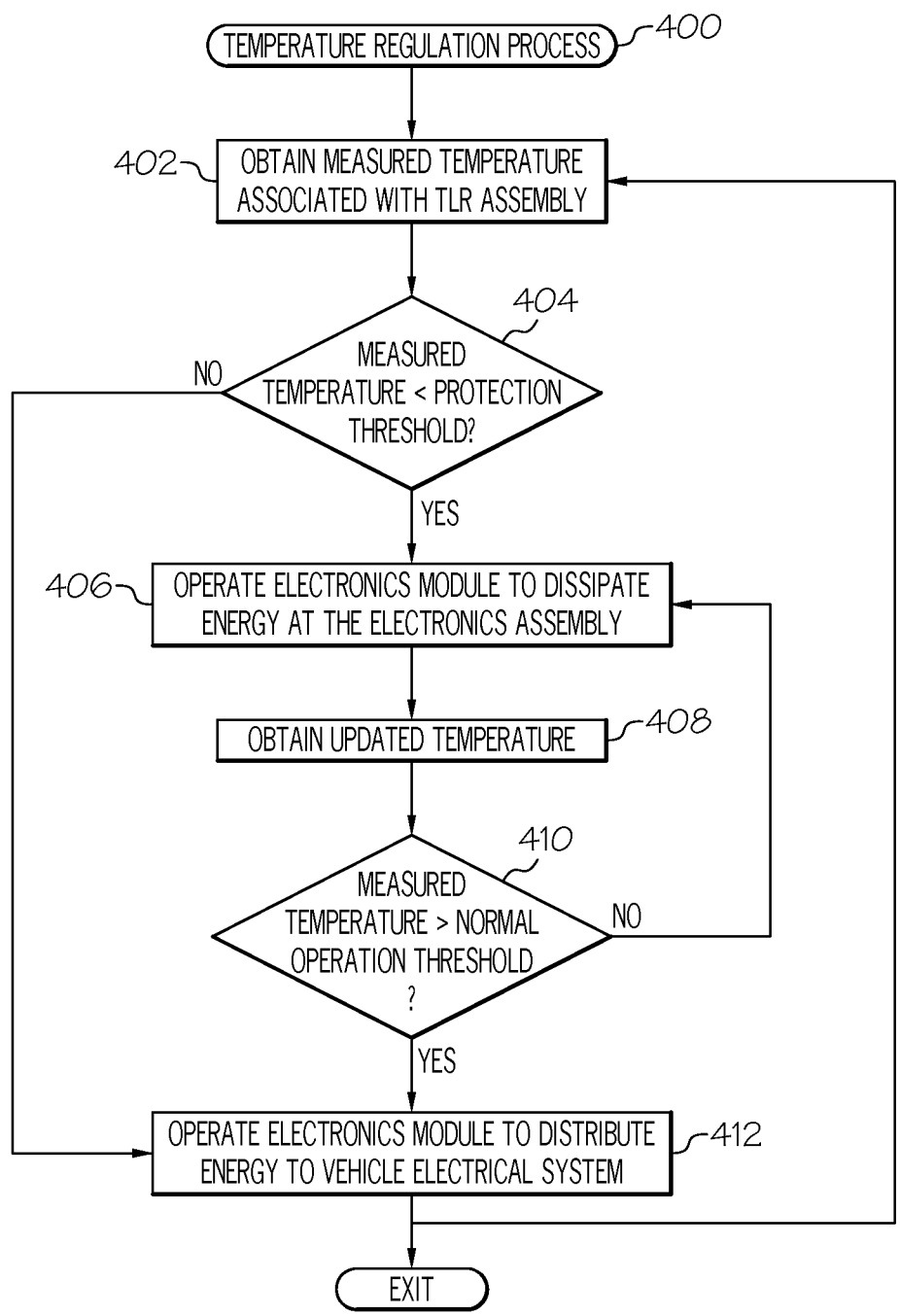
FIG. 4 is a flow diagram of an exemplary temperature regulation process suitable for implementation by a vehicle system including a throttle loss recovery system in accordance with one or more exemplary embodiments.

Although not illustrated in FIG. 3, in some embodiments, the vehicle system 300 may include one or more temperature sensing elements to measure the temperature of the turbine output fluid flow 116 within the turbine outlet conduit 322, and the electronics module 130 and/or the ECU 140 may be configured to dynamically adjust the heat dissipated by the electronics module 130 at the electronics assembly 136 to regulate the temperature of the turbine output fluid flow 116, and thereby the intake fluid flow 118, as described in greater detail below in the context of FIG. 4. Additionally, in yet other embodiments, the electronics assembly 136 may be in fluid communication with the intake fluid flow 118 downstream of the turbine outlet conduit 322 and upstream of the intake manifold 104 at other locations within the TLR assembly 302, for example, by providing an opening for the heat exchange elements 150 in the intake conduit 108 downstream of both the turbine outlet conduit 322 and the throttle 106 but upstream of the intake manifold 104 in lieu of the opening 321 in the turbine outlet conduit 322. In such embodiments, one or more temperature sensing elements may measure the temperature of the intake fluid flow 118, and the electronics module 130 and/or the ECU 140 may dynamically adjust the heat dissipated by the electronics module 130 at the electronics assembly 136 to directly regulate the temperature of the intake fluid flow 118.

FIG. 4 depicts an exemplary embodiment of a temperature regulation process 400 suitable for implementation in a vehicle system to regulate the temperature of a TLR assembly or the intake fluid flow downstream of a TLR system. The various tasks performed in connection with the illustrated process 400 may be implemented using hardware, firmware, software executed by processing circuitry, or any combination thereof. For illustrative purposes, the following description may refer to elements mentioned above in connection with FIGS. 1-3. In practice, portions of the temperature regulation process 400 may be performed by different elements of a vehicle system 100, 300, such as, the ECU 140, the electronics module 130, the temperature sensing element 134, the turbine 126, the generator 128, and/or the vehicle electrical system 132. It should be appreciated that practical embodiments of the temperature regulation process 400 may include any number of additional or alternative tasks, the tasks need not be performed in the illustrated order and/or the tasks may be performed concurrently, and/or the temperature regulation process 400 may be incorporated into a more comprehensive procedure or process having additional functionality not described in detail herein. Moreover, one or more of the tasks shown and described in the context of FIG. 4 could be omitted from a practical embodiment of the temperature regulation process 400 as long as the intended overall functionality remains intact.

The illustrated temperature regulation process 400 initializes or otherwise begins by receiving or otherwise obtaining a measured temperature associated with a TLR assembly (task 402). In one or more embodiments, the measured temperature associated with the TLR assembly 102, 200, 302 is a measured fluid flow, which depending on the embodiment, may be the measured temperature of the input fluid flow 112, the measured temperature of the intake fluid flow 118, or the measured temperature of the turbine output fluid flow 116. For example, the ECU 140 may receive or otherwise obtain a measured temperature for the ambient air surrounding the vehicle which primarily makes up the input fluid flow 112. In one or more exemplary embodiments, due to the temperature drop across the turbine 126, 226, 326, the measured temperature is obtained downstream of turbine assembly 124, 224, 324 and downstream of the electronics assembly 136 that is in fluid communication with the fluid flow to or from the turbine 126, 226, 326. In the illustrated embodiments of FIGS. 1 and 3, the measured temperature is obtained from a temperature sensing element 134 integrated with the turbine outlet conduit 122, 322 of the TLR assembly 102, 302 and corresponds to the temperature of the turbine output fluid flow 116, which, in turn influences the temperature of the intake fluid flow 118 downstream of the turbine outlet conduit 122, 322. In other embodiments, the measured temperature is directly obtained for the intake fluid flow 118 using a temperature sensing element integrated with the intake conduit 108 downstream of the turbine outlet conduit 122, 322, or alternatively, the measured temperature is directly obtained for the input fluid flow 112 using a temperature sensing element integrated with the intake conduit 108 upstream of the throttle 106, 206. In yet other embodiments, the measured temperature associated with the TLR assembly 102, 200, 302 is realized as a measured temperature obtained from a temperature sensing arrangement 706 integrated with the electronics module 130 and/or the electronics assembly 136.

The temperature regulation process 400 continues by identifying or otherwise detecting a low temperature condition based on the measured temperature, and in response, automatically adjusting operations of the turbine assembly to increase the temperature (tasks 404, 406). In exemplary embodiments, the temperature regulation process 400 determines whether the measured temperature is less than an icing protection threshold, and in response to detecting the measured temperature is less than an icing protection threshold, automatically adjusting operations of the turbine assembly to increase the temperature. In this regard, the electronics module 130 may adjust the distribution of the energy generated by the generator 128 or otherwise alter operation of the turbine 126 and/or the generator 128 in a manner that is likely to increase the temperature of the TLR assembly 102, 200, 302 and/or the intake fluid flow 118. For example, in response to the ECU 140 detecting the measured temperature of the turbine output fluid flow 116 is less than an icing protection threshold, the ECU 140 may automatically command, signal, or otherwise instruct the electronics module 130 to increase the temperature of the turbine output fluid flow 116. In response, the electronics module 130 may automatically reduce the amount of electrical energy generated by the generator 128 that is provided to the vehicle electrical system 132 by increasing the amount of the generated electrical energy that is dissipated as heat at the electronics module 130, which, in turn, increases the turbine output fluid flow 116 (either directly in TLR assembly 302 or indirectly in TLR assembly 102) via the heat exchange element 150. Additionally, the heat dissipation increases the temperature of the TLR assembly 102, 200, 302, and thereby the throttle 106, 206, 306, either directly via conduction (e.g., based on the packaging of the electronics assembly 136) or indirectly via convection by heating the fluid flow through at least a portion of the TLR assembly 102, 200, 302.

For example, in one embodiment, in response to detecting a potential icing condition, the ECU 140 may automatically command, signal, or otherwise instruct the electronics module 130 to provide an output voltage that is less than the current voltage of the vehicle battery (or alternatively, the current DC bus voltage for the vehicle electrical system). In response to the reduced target voltage set point, the electronics module 130 operates a switching (or switchable) arrangement (e.g., a FET, a silicon-controlled rectifier, or the like) that is parallel to the generator output to conduct or otherwise dissipate at least a portion of the generator output current, thereby diverting that portion of the generator output power away from the vehicle electrical system. Dissipating an increased portion of the generated power at the turbine assembly 124 increases the temperature associated with the turbine assembly 124 and reduces the portion (or percentage) of the power generated by the generator 128 that is provided to the vehicle electrical system.

In some embodiments, the electronics module 130 may command, signal, or otherwise operate the generator 128 to increase the amount of electrical energy generated by the generator 128, which, in turn, is then dissipated at the electronics module 130. In yet other embodiments, where further heat dissipation at the electronics assembly 136 is not achievable and the turbine 126 has a variable geometry, the electronics module 130 may command, signal, or otherwise operate the turbine 126 to vary the geometry and decrease the temperature drop across the turbine 126, thereby raising the temperature of the turbine output fluid flow 116 relative to the turbine input fluid flow 114. In this regard, the efficiency of the turbine assembly 124 may be temporarily reduced in a manner that is likely to increase the temperature of the intake fluid flow 118, and thereby, reduce the likelihood of icing at the intake manifold 104 or within the TLR assembly 102, 200, 302.

Still referring to FIG. 4, the illustrated temperature regulation process 400 continues by receiving or otherwise obtaining an updated measured fluid temperature and identifying or otherwise determining whether the measured temperature is greater than or equal to a normal operation threshold or safe operation threshold (task 408, 410). In exemplary embodiments, the normal operation threshold represents a temperature that is great enough so that the electronics module 130 can resume normal operations of the turbine assembly 124 with a sufficiently low likelihood of the intake temperature falling below the protection threshold within a particular duration of time after resuming normal operations. In some embodiments, the normal operation threshold may be chosen to be equal to the protection threshold, however, in other embodiments, the normal operation threshold may be equal to the protection threshold plus an offset that provides a buffer configured to reduce the likelihood of the protection threshold being reached within at least a desired amount of time. When the measured temperature is less than the normal operation threshold, the temperature regulation process 400 repeats the steps of operating the turbine assembly to increase heat dissipation and continually monitoring the measured temperature until the measured temperature is greater than or equal to the safe operation threshold. In this regard, in some embodiments, the electronics module 130 may incrementally increase the heat dissipated at the electronics assembly 136 and/or incrementally adjust operations of the turbine 126 and/or the generator 128 to incrementally increase the temperature of the turbine output fluid flow 116. For example, rather than dissipating all of the electrical energy generated by the generator 128 initially, the electronics module 130 may progressively increase the electrical energy dissipated at the electronics assembly 136 as needed while allowing any remaining available electrical energy to be provided to the vehicle electrical system 132.

Once the measured fluid temperature is greater than or equal to a normal operation threshold, the temperature regulation process 400 automatically resumes normal operations of the turbine assembly (task 412). For example, the ECU 140 may command, signal, or otherwise instruct the electronics module 130 to cease dissipation of the generated electrical energy at the electronics assembly 136 or otherwise resume operating the turbine assembly 124 in a more efficient manner to generate electrical energy for distribution to the vehicle electrical system 132. The loop defined by tasks 402, 404, 406, 408, 410 and 412 may repeat continually throughout operation of a vehicle system 100, 300 to regulate the temperature of the intake fluid flow 118 to reduce the likelihood of icing at the intake manifold 104, at the TLR assembly 102, 200, 302, or otherwise achieve a desired intake temperature for the intake manifold 104. In this regard, the efficiency of the TLR assembly 102, 200, 302 may temporarily be reduced (e.g., by dissipating a greater percentage of the generated energy as heat at the electronics assembly 136) to prevent icing at or near the throttle 106, 206, 306, protect the engine, or otherwise achieve a desired engine performance before reverting to more efficient operations once a desired intake temperature is restored.

In one or more embodiments, in addition to monitoring for a measured temperature is less than an icing protection threshold, the temperature regulation process 400 may also utilize one or more emissions control criteria to identify or otherwise detect a low temperature condition and determine when to adjust operations of the turbine assembly to increase the temperature. For example, in response to detecting a cold start condition, the ECU 140 may automatically signal the electronics module 130 to dissipate at least a portion of the generated electrical energy to increase the temperature of the intake fluid flow 118, which, in turn, facilitates increasing the temperature of the catalyst of a catalytic converter, thereby increasing conversion efficiency. Depending on the embodiment, the ECU 140 may detect the cold start condition based on a measured temperature of an exhaust fluid flow downstream of the engine being less than a cold start exhaust threshold temperature value, a measured temperature of the intake fluid flow upon startup being less than a cold start intake threshold temperature value, or a measured emissions output from an emissions sensor downstream of the engine being greater than a cold start emissions threshold value.

In response to detecting a cold start condition, the ECU 140 may maintain the heat dissipation at the electronics assembly 136 for a fixed duration of time after detecting the cold start condition (e.g., 20 seconds or an applicable emissions monitoring window) or until a measured temperature of the intake fluid flow 118 (or alternatively, a measured temperature of the exhaust fluid flow) is greater than an emissions threshold temperature. In embodiments where the ECU 140 is coupled to one or more emissions sensors within the vehicle exhaust system or otherwise downstream of the engine, the ECU 140 maintain the heat dissipation at the electronics assembly 136 until the value(s) of one or more emissions measurements are less than a corresponding threshold value(s). In this manner, the TLR assembly 102, 200, 302 may be utilized to heat the engine intake fluid flow 118 and reduce vehicle emissions at startup when the throttle 106, 206, 306 is typically closed. Moreover, in embodiments focused primarily on emissions performance (or similarly, engine icing rather than throttle icing), the electronics assembly 136 may be placed in fluid communication with the intake fluid flow 118 downstream of the turbine outlet conduit 122, 322 to facilitate heating all of the intake fluid flow 118, rather than just the bypass fluid flow 114.

To briefly summarize, the subject matter described above allows for the heat generated by the electronics associated with a TLR assembly to be effectively dissipated using either the ambient input air or the colder air downstream of the turbine in the TLR assembly. Additionally, transferring heat from the electronics into the fluid path for the turbine reduces the likelihood of icing at the TLR assembly or downstream of the turbine at cooler ambient air temperatures. In embodiments where heat is transferred from the electronics upstream of the turbine, the efficiency of the turbine may be improved (e.g., by increasing the temperature of the air at the turbine inlet relative to the temperature of the air at the turbine outlet). In other embodiments where overheating of the electronics is a concern, the heat may be transferred from the electronics more efficiently using colder air downstream of the turbine. Furthermore, the heat generated by the electronics may be dynamically adjusted to achieve a desired intake temperature.

It should be noted that although the temperature regulation process 400 is described above in the context of detecting a low temperature condition and automatically adjusting operations of the turbine assembly to increase heat generation at the turbine assembly, the temperature regulation process 400 may be implemented in an equivalent manner for a high temperature condition. For example, in response to detecting a potential overheating condition (e.g., a measured temperature that exceeds an upper threshold temperature value), the electronics module 130 may automatically adjust operations to minimize heat generation at the turbine assembly 124 and provide a greater percentage of the generator output power to the vehicle electrical system. As described in greater detail below, in the context of FIG. 5-9, the ECU 140 may automatically determine how to operate the vehicle electrical system to utilize or otherwise dissipate any excess energy that is output by the turbine assembly 124 in a manner that prevents overcharging or other potential adverse effects. Thus, the turbine 126 and the generator 128 may be designed to provide a particular power output, with the electronics module 130 and the ECU 140 cooperating to efficiently distribute the generated power without damaging vehicle electrical components while also managing temperatures associated with the turbine assembly 124.

In exemplary embodiments described below, during normal operation, the electrical energy generated by the turbine assembly upstream of the throttle is delivered or otherwise provided to the vehicle electrical system for charging one or more energy storage elements onboard the vehicle, such as the vehicle battery. To prevent overcharging or overpowering the vehicle electrical system, a control module onboard the vehicle (e.g., an engine control unit (ECU) or the like) detects or otherwise identifies an excess energy condition indicative of the current (or instantaneous) electrical power output generated by the turbine assembly exceeding the power handling capabilities of the energy storage elements onboard the vehicle or otherwise overpowering the vehicle electrical system in its current operating state. In response to the excess energy condition, the control module automatically operates the vehicle electrical system in a manner that activates or otherwise enables one or more electrical components onboard the vehicle to receive at least a portion of the excess electrical energy generated by the turbine assembly, and thereby dissipate a corresponding amount of the excess power generated by the turbine assembly. As described in greater detail below, the vehicle electrical components utilized to dissipate the excess electrical energy may be determined or otherwise identified by the control module from among all of the possible vehicle electrical components based on one or more selection criteria, such as, for example, the amount of excess energy (or power) to be dissipated, the power handling capabilities of the respective electrical component, the health or operational status of the respective electrical component, one or more measurements indicative of the current operating environment, and the like.

In practice, the control module may also automatically operate the vehicle electrical system to prevent delivery of the electrical energy generated by the turbine assembly to the energy storage element(s), thereby protecting the energy storage element(s) from exposure to the excess power generated by the turbine assembly. In this manner, excess power generated by the turbine assembly may be temporarily diverted away from the energy storage element(s) as needed to prevent overcharging or damaging the energy storage element(s). Additionally, by operating vehicle electrical components to dissipate the excess electrical energy, the electronics of the turbine assembly do not need to be designed to handle dissipating the excess electrical energy (both electrically and thermally), and moreover, reduces the need for sophisticated or complex regulation of the generator output power.

Figure 5:
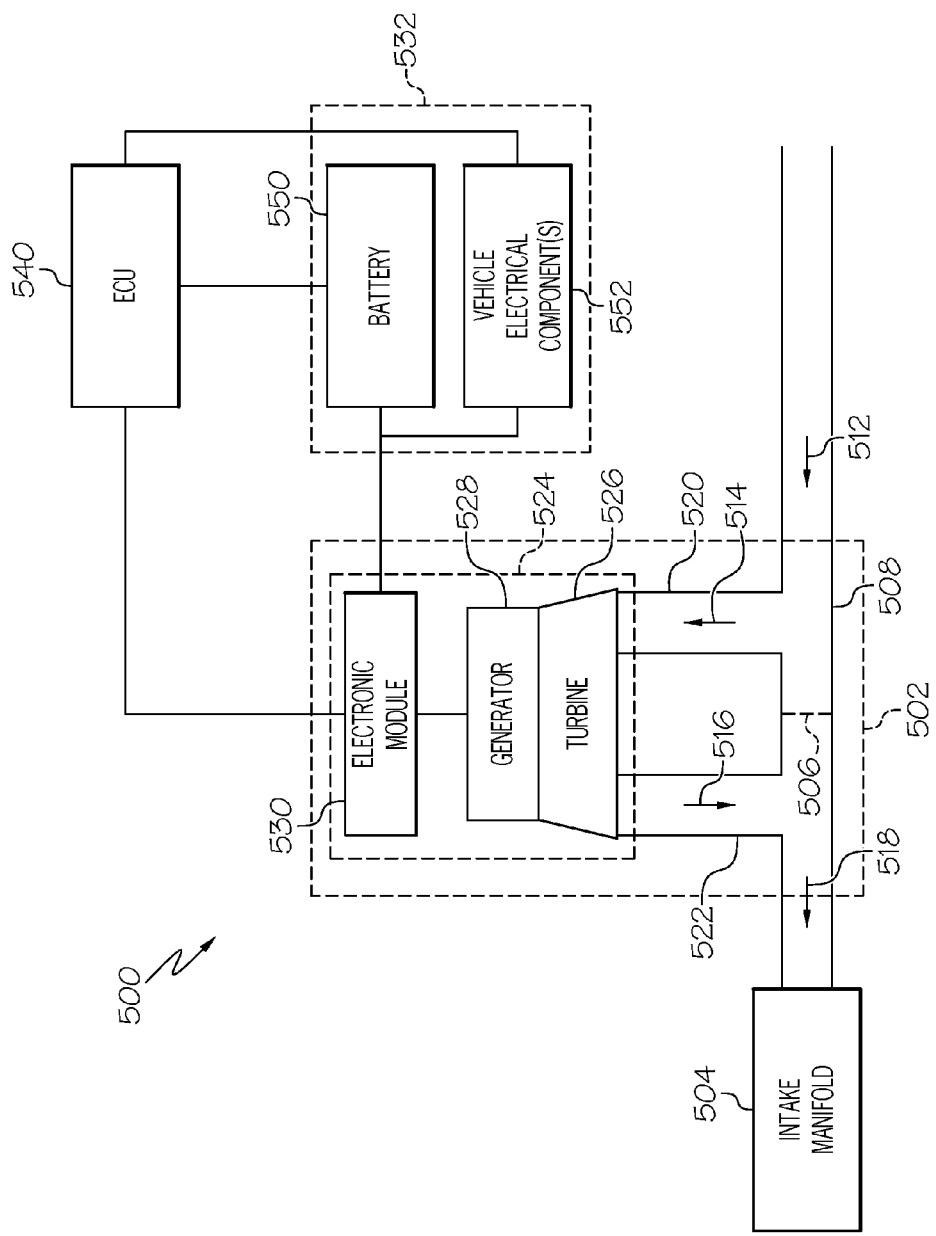
FIG. 5 is a block diagram of a vehicle system including a throttle loss recovery system in an exemplary embodiment.

FIG. 5 depicts an exemplary embodiment of a vehicle system 500 that includes a throttle loss recovery (TLR) assembly 502 configured to modulate the flow of fluid to an intake manifold 504 of an engine. The TLR assembly 502 includes a throttle 506 disposed within a conduit 508 for fluid 512 to be supplied to the engine intake. In exemplary embodiments, the fluid 512 is realized as ambient air received via a port or inlet upstream of the TLR assembly 502. The TLR assembly 502 includes a conduit 520 upstream of the throttle 506 that adjoins the engine intake conduit 508 and has an inlet configured to selectively receive at least a portion 514 of the input fluid flow 512 in a manner that is influenced by the orientation (or angle) of the throttle 506 with respect to the input fluid flow 512. In this regard, as the angle of the throttle 506 with respect to the input fluid flow 512 increases to restrict the amount of the input fluid flow 512 that passes the throttle 506 to the intake manifold 504, the amount of fluid flow 514 bypassing the throttle 506 through the conduit 520 increases, which, in turn, increases the potential electrical energy that may be generated by the turbine assembly 524. Conversely, as the angle of the throttle 506 with respect to the input fluid flow 512 decreases to allow more of the input fluid flow 512 to pass the throttle 506 to the intake manifold 504, the amount of bypass fluid flow 514 entering the conduit 520 decreases.

The outlet of the conduit 520 is coupled to the inlet (or input) of a turbine assembly 524 to establish fluid communication between the intake conduit 508 upstream of the throttle 506 and the inlet of a turbine 526 of the turbine assembly 524. In this regard, the bypass fluid flow 514 functions as the turbine input fluid flow that passes through the volute, nozzle, or and/or vanes of the turbine 526 and impacts the blades of the turbine 526 to rotate the shaft of the turbine 526. In the illustrated embodiment, the turbine assembly 524 includes an electrical generator 528 coupled to the shaft of the turbine 526 to generate electrical energy in response to rotation of the shaft caused by the turbine input fluid flow 514. The TLR assembly 502 includes another conduit 522 having an inlet coupled to the outlet of the turbine 526 and an outlet coupled to the intake conduit 508 downstream of the throttle 506 to establish fluid communication between the turbine 526 and the intake conduit 508 for the turbine output fluid flow 516. The turbine output fluid flow 516 combines with whatever portion of the input fluid flow 512 passes the throttle 506 to provide the intake fluid flow 518 supplied to the intake manifold 504.

Referring again to FIG. 5, the turbine assembly 524 also includes an electronics module 530 that is coupled between the generator 528 and the vehicle electrical system 532. The electronics module 530 includes the electrical elements or components that are configured to receive the electrical energy generated by the generator 528 and provide an interface between the output of the generator 528 and the vehicle electrical system 532 for delivering the generated electrical energy to the vehicle electrical system 532. For example, the electronics module 530 may include a rectifier coupled to a voltage bus associated with the vehicle electrical system 532 to rectify the output of the generator 528 to a direct current voltage level corresponding to the voltage bus. Additionally, in some embodiments, the electronics module 530 may include resistors, capacitors, inductors, diodes, transistors, and/or other electrical circuit elements configured to dissipate at least a portion of the electrical energy generated by the generator 528. In one or more exemplary embodiments, the electronics module 530 also includes a control module that is configured to control operations of the turbine assembly 524, for example, by varying the loading of the generator 528, varying the geometry of the turbine 526 (e.g., in the case of a variable geometry turbine), varying the amount of generated electrical energy that is dissipated at or by the electronics module 530, varying the amount of generated electrical energy that is output to the vehicle electrical system 532, and the like. In this regard, the control module of the electronics module 530 may be coupled to the engine control unit (ECU) 540 and configured to support the various power regulation processes described herein.

In exemplary embodiments, the vehicle electrical system 532 includes at least one energy storage element 550 coupled to the turbine assembly 524 via the electronics module 530. The energy storage element 550 may be realized as a battery (or battery pack) that functions as an electrical energy source for the vehicle, however, in alternative embodiments, the energy storage element 550 may be realized as an ultracapacitor or another suitable energy storage device. That said, for purposes of explanation, and without limitation, the energy storage element 550 may alternatively be referred to herein as a battery. In practice, the battery 550 may be coupled a voltage bus for distributing electrical energy throughout the vehicle electrical system 532 to one or more vehicle electrical components 552, such as, for example, the vehicle heating ventilation and air conditioning (HVAC) system, the vehicle lighting system (e.g., headlights, tail lights, and the like), the vehicle electric window defroster(s) (or defoggers), the vehicle head unit, radio(s), entertainment system, navigation system, or the like. In this regard, the voltage bus may provide the voltage of the battery 550 as a supply voltage to the one or more vehicle electrical components 552, which, when activated or are otherwise in operation, function as electrical loads on the voltage bus. In some embodiments, the vehicle electrical components 552 may be selectively coupled to the voltage bus via one or more switching arrangements that are operable by the ECU 540 to control activation or operation of the respective electrical components 552. In a similar manner, in some embodiments, the battery 550 may be selectively coupled to the voltage bus and/or the electronics module 530 via one or more switching arrangements to support electrically decoupling or electrically disconnecting the battery 550 from the electrical energy output by the generator 528, as described in greater detail below in the context of FIGS. 8-9.

Still referring to FIG. 5, the ECU 540 generally represents the component of the vehicle system 500 that is coupled to the battery 550, the vehicle electrical components 552, the turbine assembly 524, and/or other vehicle components (e.g., the various knobs, buttons, switches, and other human-machine interface elements within the vehicle) to support operations of the vehicle system 500. In practice, the ECU 540 includes one or more control modules (e.g., a processor, a controller, a microprocessor, a microcontroller, an application specific integrated circuit, or the like) configured to support operations of the vehicle system 500. The ECU 540 may also include a data storage element, such as a memory, one or more registers, or another suitable non-transitory short or long term computer-readable storage media, which is capable of storing computer-executable programming instructions or other data for execution that, when read and executed by a control module of the ECU 540, cause the ECU 540 to execute and perform one or more of the processes tasks, operations, and/or functions described herein.

In exemplary embodiments described herein, the ECU 540 is configured to receive or otherwise obtain, from the battery 550, data or information indicative of one or more performance characteristics of the battery 550, such as, for example, the current state of charge of the battery, the current battery voltage, the current charging current flowing to the battery, and the like. As described in greater detail below, based on the value of a current performance characteristic of the battery 550, the ECU 540 may detect or otherwise identify an excess energy condition where any electrical power output by the turbine assembly 524 may potentially exceed the charging capabilities of the battery 550. In response to the excess energy condition, the ECU 540 effectively electrically decouples or electrically disconnects the energy storage element 550 from the turbine assembly 524, at least partially, so that at least a portion of the electrical energy generated by the turbine assembly 524 is diverted away from the battery 550 and delivered or otherwise dissipated elsewhere within the vehicle system 500.

In one or more embodiments, in response to the excess energy condition, the ECU 540 automatically activates or otherwise operates one or more of the vehicle electrical components 552 to increase its loading on the voltage bus, and thereby dissipate at least a portion of the excess electrical energy generated by the turbine assembly 524. Thus, the battery 550 is effectively electrically decoupled from the output of the turbine assembly 524, at least partially, by virtue of the electrical energy generated by the turbine assembly 524 being diverted away from the battery 550 and dissipated by another vehicle electrical component 552 within the vehicle electrical system 532. In such embodiments, the ECU 540 may identify or otherwise determine which vehicle electrical component(s) 552 to use to dissipate the excess electrical energy based on current user configurable settings within the vehicle (e.g., whether or not the HVAC system is being utilized, whether or not the headlights are on, or the like). In this regard, when a driver or passenger of the vehicle has enabled a particular vehicle electrical component 552 (e.g., the HVAC system, the headlights, seat warmers, or the like), the ECU 540 may automatically divert or otherwise redirect the excess electrical energy generated by the turbine assembly 524 to that particular vehicle electrical component (e.g., by activating, closing or otherwise turning on a switching arrangement configured between the output of the turbine assembly 524 and that vehicle component 552).

In embodiments where a vehicle occupant has not enabled any or enough vehicle electrical components 552 to dissipate the excess electrical energy, the ECU 540 may automatically identify or otherwise determine which vehicle electrical component 552 or combination of vehicle electrical components 552 should be activated based on one or more selection criteria to dissipate the excess electrical energy in a manner that has the lowest negative cumulative impact on the vehicle performance and/or the passenger experience. In this regard, the ECU 540 may temporarily turn on one or more vehicle electrical components 552 which are otherwise turned off solely for purposes of dissipating the excess power generated by the turbine assembly 524, and then turn off those components 552 when the excess power dissipation is no longer desirable. For example, the ECU 540 may automatically activate or otherwise turn on an electric rear window defroster 552 of the vehicle (e.g., by activating, closing or otherwise turning on a switching arrangement configured between the output of the turbine assembly 524 and the rear window defroster 552), which, in turn, dissipates at least a portion of the electrical energy output by the turbine assembly 524. In this regard, it should be noted that the rear window defroster 552 is continually cooled by the ambient airflow over the rear window of the vehicle, and as such, any heat generated by the rear window defroster 552 is effectively imperceptible to vehicle occupants. Similarly, the ECU 540 may automatically activate or otherwise turn on a component of the vehicle lighting system 552 (e.g., by activating, closing or otherwise turning on the daytime running lights, the parking lights, the headlights, or the like), which, in turn, dissipates at least a portion of the electrical energy output by the turbine assembly 524 in a manner that does not adversely impact the performance of the vehicle or the user experience for the vehicle occupants.

Additionally or alternatively, in some embodiments, the ECU 540 operates a switching arrangement configured between the electronics module 530 and the battery 550 to electrically decouple, disconnect, or otherwise isolate the battery 550 from the output of the turbine assembly 524. In this regard, during normal operation, the switching arrangement configured between the electronics module 530 and the battery 550 may be closed, turned on, or otherwise activated to electrically connect the battery 550 to the output of the turbine assembly 524 to provide a path for current that supports recharging the battery 550 with electrical energy generated by the turbine assembly 524. In response to detecting an excess energy condition, the ECU 540 may open, turn off, or otherwise deactivate the switching arrangement configured between the electronics module 530 and the battery 550 to electrically disconnect the battery 550 from the output of the turbine assembly 524 to prevent potential overcharging or other adverse effects on the battery 550 that could result from excess power delivery.

In various embodiments, the ECU 540 may also command, signal, or otherwise instruct the electronics module 530 to dissipate at least a portion of the generated electrical energy at the electronics module 530 in lieu of delivering that portion of the generated electrical energy to the vehicle electrical system 532. For example, when the ECU 540 is unable to identify enough vehicle electrical components 552 to dissipate the entire amount of excess energy generated by the turbine assembly 524, the ECU 540 may provide a signal or command to the electronics module 530 to dissipate the excess energy at the turbine assembly 524. In this regard, in some embodiments, the ECU 540 may dynamically determine an optimized distribution of the excess energy among the vehicle electrical components 552 and the electronics module 530, for example, to ensure that power from the alternator charging the battery 550 is not dissipated by the vehicle electrical components 552 and/or to ensure that the battery 550 is not overcharged (e.g., by maintaining the state of charge below an upper threshold value or within a range of values, by maintaining the battery charging current below a charging current limit, or the like). For example, if the amount of excess energy generated by the turbine assembly 524 to be dissipated is less than the power consumption of the rear window defroster, the ECU 540 may automatically identify and enable one or more vehicle electrical components 552 that have a total power consumption that is less than or equal to the amount of excess power to be dissipated, thereby ensuring that alternator power is not dissipated by the enabled vehicle electrical component(s) 552. Moreover, when the total power consumption for the selected vehicle electrical component(s) 552 is less than the excess power to be dissipated, the ECU 540 may signal, command, or otherwise instruct the electronics module 530 to dissipate the remaining portion of the generated power as heat at the electronics assembly, thereby ensuring that the battery 550 is not further charged while also ensuring that alternator power is not consumed by the enabled vehicle electrical component(s) 552.

Figure 6:
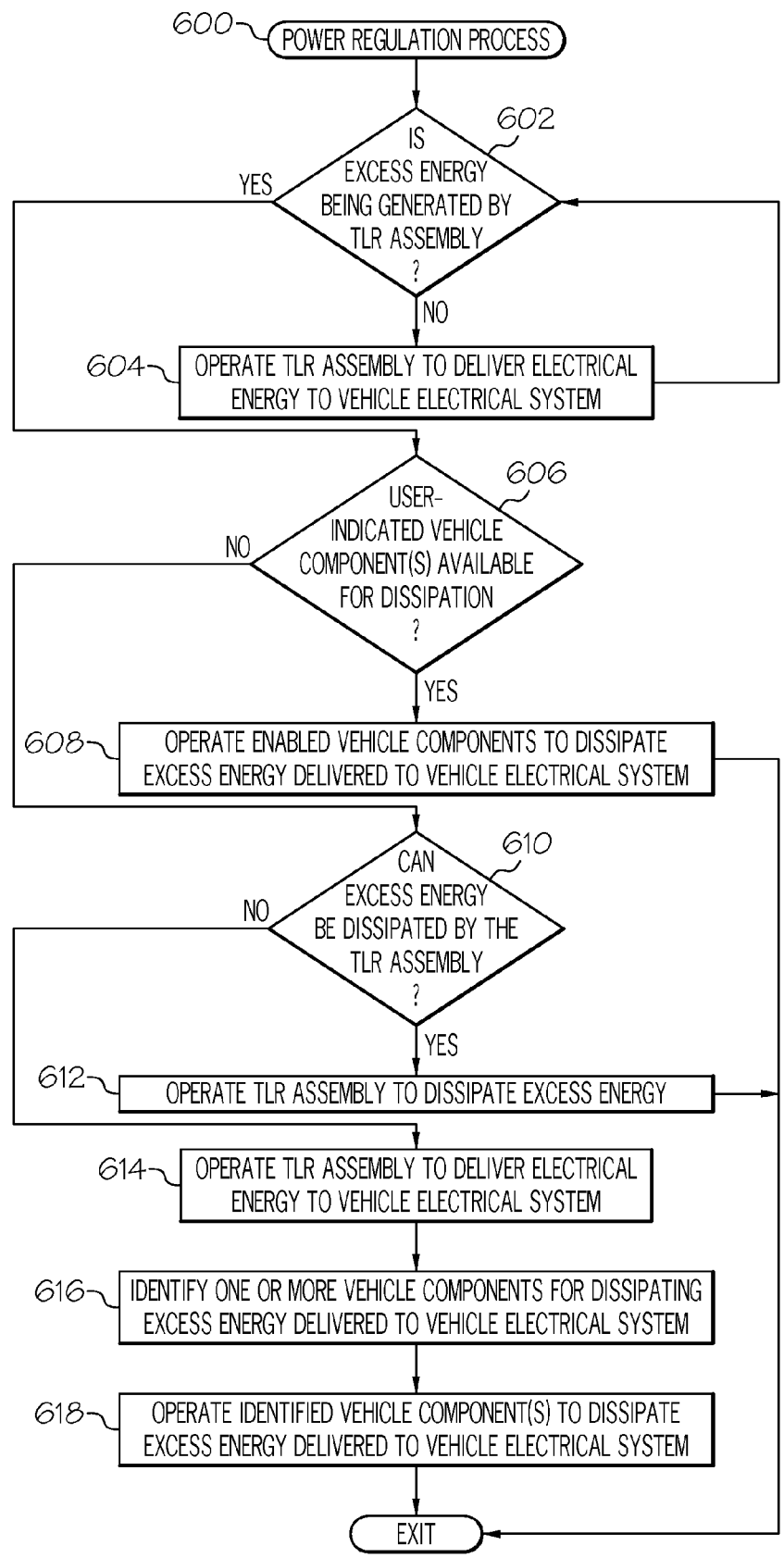
FIG. 6 is a flow diagram of an exemplary power regulation process suitable for implementation by a vehicle system including a throttle loss recovery system in accordance with one or more exemplary embodiments.

FIG. 6 depicts an exemplary embodiment of a power regulation process 600 suitable for implementation in a vehicle system to regulate the dissipation of electrical energy generated by a TLR system. The various tasks performed in connection with the illustrated process 600 may be implemented using hardware, firmware, software executed by processing circuitry, or any combination thereof. For illustrative purposes, the following description may refer to elements mentioned above in connection with FIGS. 2 and 5. In practice, portions of the power regulation process 600 may be performed by different elements of the vehicle system 500, such as, the ECU 540, the electronics module 530, the turbine 526, the generator 528, the battery 150, and/or the vehicle electrical component(s) 552. It should be appreciated that practical embodiments of the power regulation process 600 may include any number of additional or alternative tasks, the tasks need not be performed in the illustrated order and/or the tasks may be performed concurrently, and/or the power regulation process 600 may be incorporated into a more comprehensive procedure or process having additional functionality not described in detail herein. Moreover, one or more of the tasks shown and described in the context of FIG. 6 could be omitted from a practical embodiment of the power regulation process 600 as long as the intended overall functionality remains intact.

In exemplary embodiments, the power regulation process 600 identifies or otherwise determines whether excess electrical energy is being generated by the TLR assembly, and operating the TLR assembly to deliver the generated electrical energy to the vehicle electrical system when the TLR assembly is not generating excess energy (tasks 602, 604). In one or more embodiments, the ECU 540 identifies an excess energy condition by monitoring a performance characteristic of the battery 550, such as, for example, a current state of charge of the battery 550, a current output voltage of the battery 550, a current electrical current flowing to/from the battery 550, or the like. The ECU 540 may identify the absence of an excess energy condition when the performance characteristic of the battery 550 is less than a threshold value that indicates that the battery 550 is fully charged (e.g., when current state of charge of the battery 550 or the voltage across terminals of the battery 550 is less than an upper threshold) or that the battery 550 is being charged at an acceptable rate (e.g., when a charging current flowing to the battery 550 is less than a maximum charging current threshold).

In other embodiments, the ECU 540 may identify the absence of an excess energy condition based on one or more of the orientation (or position) of the throttle 506 and the speed of the vehicle. For example, if the vehicle is traveling at relatively low speeds and/or the throttle 506 is orientated so that the mass flow rate of the bypassing fluid flow 514 is likely to be less than a threshold amount, the ECU 540 may determine that the turbine assembly 524 is unlikely to generate excess electrical power. In yet other embodiments, based on the speed of the vehicle, the position of the throttle 506, and the operating status of the turbine assembly 524 (e.g., the state of any variable geometry members of the turbine 526), the ECU 540 may calculate or otherwise determine an estimated electrical power likely to be generated by the turbine assembly 524 and output to the vehicle electrical system 532. Additionally, the ECU 540 may calculate or otherwise determine an estimated power handling capability of the battery 550 based on the difference between the current value of a performance characteristic of the battery 550 and its corresponding charging threshold value (e.g., the difference between the current state of charge of the battery 550 and the upper state of charge threshold), and identify an excess energy condition when the estimated generated electrical power is greater than the estimated power handling capability of the battery 550. In alternative embodiments, the ECU 540 may calculate or otherwise determine an estimated power handling capability of the vehicle electrical system 532 based on the current power handling capability of the battery 550 and the current power handling capability of the currently enabled (or activated) vehicle electrical components 552, and identify an excess energy condition when the estimated generated electrical power is greater than the estimated power handling capability of the vehicle electrical system 532.

In response to detecting an excess energy condition, the power regulation process 600 continues by identifying or otherwise determining whether there are any available vehicle electrical components that have been selected or enabled by a user that are available for dissipating the excess electrical energy from the TLR assembly, and if so, automatically operating the identified vehicle electrical component(s) to dissipate the excess electrical energy generated by the TLR assembly (task 606, 608). In this regard, the ECU 540 automatically operates the vehicle electrical system 532 to redistribute the electrical energy generated by the turbine assembly 524 so that the excess electrical energy is dissipated or otherwise absorbed by the vehicle component(s) 552 that a vehicle occupant has enabled rather than the battery 550. For example, as described in greater detail below in the context of FIGS. 8-9, the ECU 540 may operate one or more switching arrangements within the vehicle electrical system 532 to electrically disconnect the battery 550 from the output of the turbine assembly 524 and electrically connect the vehicle electrical component(s) 552 that have been enabled by a user. In this manner, current generated by the turbine assembly 524 may be dissipated by the vehicle electrical component(s) 552 and prevented from flowing to the battery 550. Based on the current speed of the vehicle, the current state of charge and/or output voltage of the battery 550 (or alternatively, the output voltage from the TLR assembly 502), the ECU 540 may calculate, estimate, or otherwise determine the total power output (or output current) currently being produced by the TLR assembly 502. Thereafter, the ECU 540 may determine the amount of excess power to be dissipated based on the difference between the total generated power output and the current power handling (or charging) capability of the battery 550.

In the illustrated embodiment of FIG. 6, when a vehicle occupant has not manually enabled or activated vehicle electrical components capable of dissipating the excess energy generated by the TLR assembly, the power regulation process 600 may identify or otherwise determine whether the excess energy can be dissipated by the TLR assembly, and if so, operate the TLR assembly to dissipate the excess electrical energy in lieu of delivering the excess energy to the vehicle electrical system (tasks 610, 612). In some embodiments, the electronics module 530 may be configured to selectively dissipate at least a portion of the electrical energy generated by the generator 528 rather than delivering that portion of electrical energy to the vehicle electrical system 532. When the ECU 540 identifies that the electronics module 530 is capable of dissipating the excess electrical energy, the ECU 540 commands, signals, or otherwise instructs the electronics module 530 to operate in a power dissipation mode where electrical energy generated by the generator 528 is dissipated rather than being delivered to the vehicle electrical system 532. In one embodiment, the ECU 540 determines whether the electronics module 530 is capable of dissipating the excess electrical energy based on a measured temperature associated with the electronics module 530. In this regard, when the temperature of the electronics module 530 is less than a maximum operating temperature associated with the electronics module 530, the ECU 540 may determine that the excess electrical energy can be dissipated by the electronics module 530 and initiate operation of the electronics module 530 in a power dissipation mode.

Still referring to FIG. 6, when the excess power cannot be dissipated by the TLR assembly, the illustrated power regulation process 600 operates the TLR assembly to deliver the generated energy to the vehicle electrical system, automatically identifies or otherwise determines one or more vehicle electrical components for dissipating the generated energy, and operates the identified vehicle electrical component(s) to dissipate the excess power generated by the TLR assembly (tasks 614, 616, 618). In exemplary embodiments, the ECU 540 automatically selects or otherwise identifies a particular vehicle electrical component 552 or a combination thereof that is best suited to dissipate the electrical energy based on one or more selection criteria. Thereafter, the ECU 540 automatically operates the identified vehicle components 552 and/or the corresponding switching arrangements of the vehicle electrical system 532 to deliver the electrical energy output from the turbine assembly 524 to the identified vehicle components 552 in a manner that mitigates or otherwise prevents the electrical energy output by the turbine assembly 524 from being delivered to the battery 550.

In some embodiments, the ECU 540 may utilize a hierarchical list to identify or select which vehicle electrical component 552 should be utilized. In this regard, when a preferred vehicle electrical component 552 is unavailable (e.g., due to malfunction or some other adverse situation or the like) or its power consumption exceeds the current amount of excess power (e.g., to avoid drawing alternator power), the ECU 540 may select the next most preferred vehicle electrical component 552 from the list, and so on. Similarly, if a preferred vehicle electrical component 552 is not capable of dissipating the entirety of the excess energy generated by the turbine assembly 524 (e.g., due to limits on the current or power handling capability of the component 552), the ECU 540 may select the next most preferred vehicle electrical component 552 from the list for use in combination with the more preferred vehicle electrical component 552, and so on, until a combination of vehicle electrical components 552 capable of dissipating the entirety of the excess generated electrical energy has been identified. Thereafter, the ECU 540 automatically operates the identified vehicle components 552 and/or the switching arrangements of the vehicle electrical system 532 to deliver the electrical energy output by the turbine assembly 524 to the identified vehicle components 552 in a manner that mitigates or otherwise prevents the electrical energy output by the turbine assembly 524 from being delivered to the battery 550.

In other embodiments, the ECU 540 may determine which vehicle electrical component(s) 552 should be utilized to dissipate the excess energy based on current environmental conditions and/or the current operating status of the vehicle. For example, the ECU 540 may be communicatively coupled to various sensor systems in the vehicle to receive or otherwise obtain measurements of the environmental conditions associated with the vehicle (e.g., the ambient temperature outside of the vehicle, the ambient lighting outside of the vehicle, the temperature in the passenger compartment of the vehicle, and the like) along with information pertaining to the current operating status of the vehicle (e.g., which gear the vehicle is in, the current speed of the vehicle, and the like). Using the available information, the ECU 540 may select, in real-time, the vehicle electrical component 552 or combination thereof that is least likely to be perceived by vehicle occupants or other drivers without compromising other objectives.

For example, when the vehicle speed is greater than a threshold value and/or the ambient temperature is less than a threshold temperature, the ECU 540 may automatically select the rear window defroster 552 as a vehicle electrical component 552 that should be utilized to dissipate the excess energy based on the likelihood of the mass flow over the rear window dissipating the heat generated by the rear window defroster 552 so that its operation is substantially imperceptible to vehicle occupants. Alternatively, at lower vehicle speeds and warmer ambient air temperatures, or when the temperature in the passenger compartment is above a threshold value (e.g., a desired temperature set by a driver or passenger), the ECU 540 may automatically select the side window heaters 552 as the vehicle electrical components 552 that should be utilized to dissipate the excess energy based on the side window heaters 552 being less likely to influence the temperature in the passenger compartment or otherwise be perceptible to vehicle occupants. As another example, when the ambient lighting outside of the vehicle indicates at least a threshold luminance, the ECU 540 may automatically select the parking lights, the daytime running lights, the dashboard lights, and/or another lighting component 552 as the vehicle electrical component(s) 552 that should be utilized to dissipate the excess energy based on the likelihood that increasing the output luminance of those vehicle lighting systems 552 will be substantially imperceptible given the ambient luminance. It should be appreciated that the aforementioned examples are provided solely for the purposes of explanation and are not intended to be limiting; in practice, numerous different environmental conditions, vehicle statuses, and other selection criteria may be utilized to automatically select the optimal vehicle electrical component(s) 552 in real-time.

The power regulation process 600 may be repeated indefinitely throughout operation of the vehicle system 500 to dynamically redistribute and dissipate the energy generated by the TLR assembly 502 in an appropriate manner. Thus, when the battery 550 is capable of absorbing the generated energy, the ECU 540 operates the vehicle electrical system 532 in a manner that allows the TLR assembly 502 to contribute to recharging the battery 550. In periods of time where the battery 550 is incapable of absorbing the generated energy (e.g., at freeway speeds when the throttle 506 is positioned to obstruct the input fluid flow 512 and the battery 550 is essentially fully charged), the ECU 540 automatically operates the vehicle electrical system 532 to dissipate the generated energy in a useful manner, or if none is available, operates the turbine assembly 524 and/or the vehicle electrical system 532 to dissipate the generated electrical energy in a manner that is substantially imperceptible to vehicle occupants and does not risk exceeding any operational limits of the electronics module 530 or the vehicle electrical components 552. Thereafter, once the battery 550 resumes being capable of absorbing the generated energy, the ECU 540 may automatically operate the vehicle electrical system 532 to revert to allowing the TLR assembly 502 to contribute to recharging the battery 550.

Figure 7:
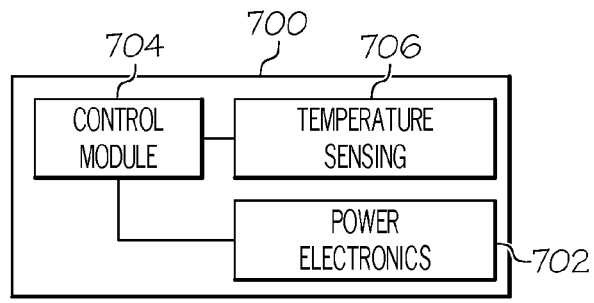
FIG. 7 is a block diagram of an exemplary turbine assembly electronics module suitable for use in the vehicle system of FIG. 5 in accordance with one or more embodiments of the power regulation process of FIG. 6.

FIG. 7 depicts an exemplary embodiment of an electronics module 700 suitable for use as the electronics module 530 in the turbine assembly 524 of FIG. 5 in conjunction with the power regulation process 600 of FIG. 6. As described above, the electronics module 700 includes power electronics 702 coupled between the output of the generator 528 and the vehicle electrical system 532, and the power electronics 702 generally represent the components of the electronics module 700 that are configured to filter, rectify, or otherwise process the electrical energy output by the generator 528 and deliver the generated electrical energy to the vehicle electrical system 532. Additionally, the power electronics 702 may include circuitry configured to selectively dissipate the generated electrical energy in response to commands from a control module 704 of the electronics module 700. In this regard, the control module 704 generally represents the hardware, processing logic and/or other components of the electronics module 700 that are coupled to the ECU 540 and configured to support operations of the electronics module 700 described herein. In practice, the control module 704 may include or otherwise be realized as a processor, a controller, a microprocessor, a microcontroller, an application specific integrated circuit, a field programmable gate array, any suitable programmable logic device.

The illustrated electronics module 700 also includes a temperature sensing arrangement 706 disposed proximate the power electronics 702 to sense, measure, or otherwise quantify the temperature of the power electronics 702 and/or the electronics module 700. For example, the temperature sensing arrangement 706 and the power electronics 702 may be packaged together in a common device package or device housing. In this regard, the temperature sensing arrangement 706 may be affixed, mounted, or otherwise formed on the same substrate as the power electronics 702 to provide thermal coupling between the temperature sensing arrangement 706 and the power electronics 702. The control module 704 may also be mounted on the same substrate as the power electronics 702 and the temperature sensing arrangement 706 and packaged in the same device package or housing, which, in turn, is packaged within the turbine assembly 524 (e.g., by mounting the electronics module 700 to the generator 528 and/or the turbine 526).

Referring to FIG. 7 with reference to FIGS. 5 and 6, in one or more embodiments, the ECU 540 is coupled to the temperature sensing arrangement 706 (either directly or via the control module 704) to receive or otherwise obtain a measured temperature associated with the electronics module 700. When the measured temperature of the electronics module 530, 700 less than a maximum operating temperature associated with the electronics module 530, 700 and the ECU 540 determines excess electrical energy cannot be usefully dissipated using user-enabled vehicle electrical components 552, the ECU 540 may determine that the excess electrical energy can be dissipated by the electronics module 530, 700 and command, signal, or otherwise instruct the control module 704 to operate the power electronics 702 to dissipate the excess electrical energy generated by the generator 528 at the electronics module 530, 700. Conversely, when the measured temperature of the electronics module 530, 700 greater than or equal to the maximum operating temperature, the ECU 540 may automatically identify and utilize one or more vehicle electrical components 552 to dissipate the excess electrical energy as described above (e.g., tasks 616, 618). In some embodiments, the control module 704 may be coupled to the temperature sensing arrangement 706 instead of the ECU 540, with the control module 704 detecting or otherwise identifying when the measured temperature of the electronics module 530, 700 is greater than or equal to a maximum operating temperature and providing, to the ECU 540, a corresponding indication (e.g., a flag bit) that the electronics module 530, 700 should not dissipate any excess energy.

Figure 8:
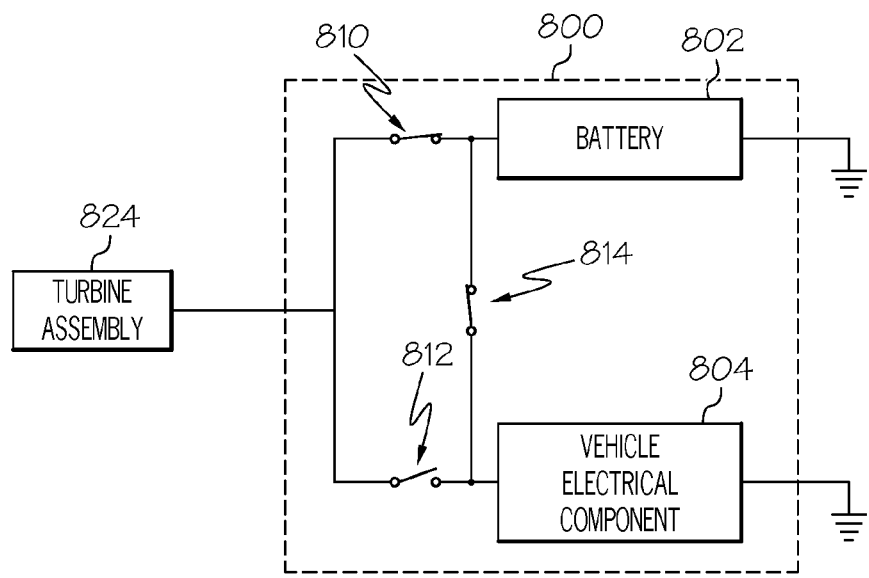
FIGS. 8-9 are block diagrams of an exemplary vehicle electrical system suitable for use in the vehicle system of FIG. 5 in accordance with one or more embodiments of the power regulation process of FIG. 6.
Figure 9:
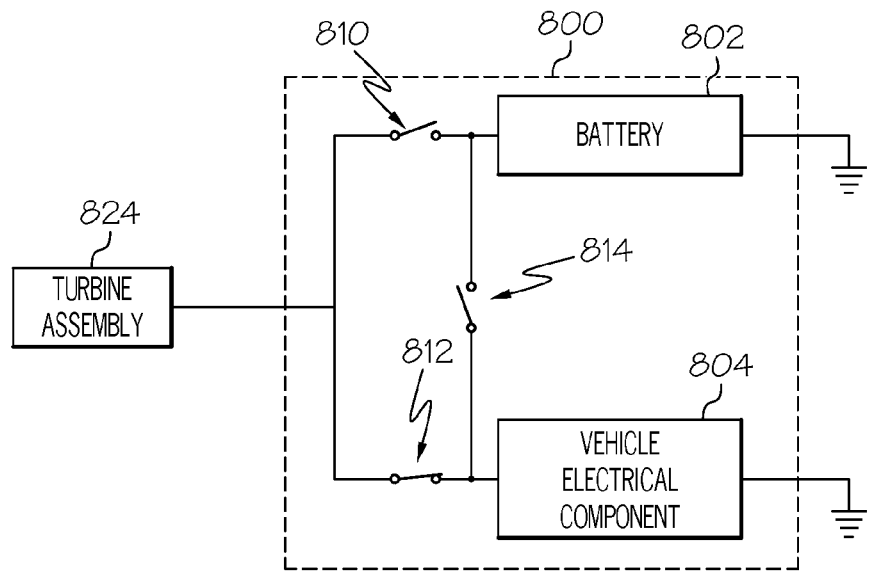

FIGS. 8-9 depict an exemplary sequence of operating a vehicle electrical system 800 suitable for use as the vehicle electrical system 532 in the vehicle system 500 of FIG. 5 in accordance with one or more exemplary embodiments of the power regulation process 600 of FIG. 6. It should be appreciated that FIGS. 8-9 depict a simplistic representation of the vehicle electrical system 800 for purposes of explanation, and the vehicle electrical system 800 depicted in FIGS. 8-9 is not intended to limit the subject matter described herein in any way. Practical embodiments of the vehicle electrical system 800 may include any number or type of vehicle electrical components 804, any number or type of energy storage elements 802, and any number or type of switching arrangements 810, 812, 814 configured to support the subject matter described herein.

Referring to FIGS. 8-9, and with continued reference to FIGS. 5 and 6, the illustrated vehicle electrical system 800 includes a battery 802 (e.g., energy storage element 550) and at least one vehicle electrical component 804 (e.g., vehicle electrical component 552). The battery 802 is selectively electrically coupled to the output of the turbine assembly 824 (e.g., turbine assembly 524) via a first switching arrangement 810 coupled between the battery 802 and the output of the turbine assembly 824, and the vehicle electrical component 804 is selectively electrically coupled to the output of the turbine assembly 824 via a second switching arrangement 810 coupled between the vehicle electrical component 804 and the output of the turbine assembly 824. Additionally, in some embodiments, the vehicle electrical component 804 is also selectively electrically coupled to the battery 802 via a third switching arrangement 814 coupled between the vehicle electrical component 804 and the battery 802.

Referring to FIG. 8, in the absence of an excess energy condition, the ECU 540 closes, turns on, or otherwise activates the first switching arrangement 810 to provide an electrical connection and a corresponding path for current from the output of the turbine assembly 824 to the battery 802, thereby delivering the electrical energy generated by the turbine assembly 824 to the battery 802 to charge the battery 802 (e.g., tasks 602, 604). Additionally, if the vehicle electrical component 804 has been enabled by a vehicle occupant, the ECU 540 may also activate the third switching arrangement 814 to provide an electrical connection between the battery 802 and the vehicle electrical component 804 so that the battery 802 functions as an energy source for the vehicle electrical component 804. Otherwise, in embodiments where the vehicle electrical component 804 has not been enabled, the ECU 540 may deactivate the third switching arrangement 814 to prevent any current flow from the battery 802 to the vehicle electrical component 804. In the illustrated embodiment, in the absence of an excess energy condition, the ECU 540 also deactivates the second switching arrangement 812 to electrically decouple the vehicle electrical component 804 from the turbine assembly 824 to prevent diverting charging current away from the battery 802.

Referring now to FIG. 9, in response to identifying an excess energy condition, the ECU 540 automatically opens, turns off, or otherwise deactivates the first switching arrangement 810 to electrically decouple the battery 802 from the output of the turbine assembly 824 to prevent delivery of excess electrical energy to the battery 802 (e.g., tasks 608, 618). Additionally, the ECU 540 automatically closes, turns on, or otherwise activates the second switching arrangement 812 to provide an electrical connection and a corresponding path for current from the output of the turbine assembly 824 to the vehicle electrical component 804, thereby delivering at least a portion of the electrical energy generated by the turbine assembly 824 to the vehicle electrical component 804, which, in turn, dissipates the electrical energy received from the turbine assembly 824. In embodiments where the vehicle electrical component 804 was previously enabled and being powered by the battery 802, the ECU 540 may also automatically deactivate the third switching arrangement 814 in concert with deactivating the first switching arrangement 810 and activating the second switching arrangement 812 to prevent current flow between the battery 802 and the vehicle electrical component 804. The ECU 540 may maintain the first switching arrangement 810 deactivated and the second switching arrangement 812 activated for as long as the excess energy condition exists to prevent excess electrical energy generated by the turbine assembly 824 from being delivered to the battery 802. Thereafter, in response to identifying an absence of the excess energy condition, the ECU 540 may operate the vehicle electrical system 800 to revert back to the initial operating state as depicted in FIG. 8 (e.g., by activating switching arrangement 810 and deactivating switching arrangement 812 in concert) to resume delivery of electrical energy generated by the turbine assembly 824 to the battery 802.

To briefly summarize, the subject matter described herein allows for the excess energy generated by a TLR assembly to be effectively dissipated using vehicle electrical components that are not subject to the same operating temperature constraints as the under-the-hood components and in a manner that is substantially imperceptible to vehicle occupants. For example, excess electrical energy generated by the may be diverted away from the vehicle battery and/or other energy storage elements and provided to one or more other vehicle electrical components, such as window defrosters, lighting systems, or the like, that are capable of dissipating the excess energy without significantly impacting the user experience. Additionally, in the case of window defrosters or external lighting systems that are exposed or otherwise thermally coupled to ambient air, the mass flow associated with a moving vehicle is capable of cooling the vehicle electrical components, thereby minimizing the effects of any added heat that may be dissipated by the activated electrical components. By diverting the excess energy generated by the TLR assembly elsewhere onboard the vehicle, the likelihood of overcharging of the vehicle battery and/or other energy storage elements is reduced, and furthermore, the electronics associated with the TLR assembly do not need to be responsible for regulating the amount of energy output by the TLR assembly or dissipating any excess energy, thereby simplifying the electronics and reducing the likelihood of the electronics overheating.

After operating the vehicle electrical component(s) to dissipate the excess energy generated by the turbine assembly, the control module detects or otherwise identifies the absence of the excess energy condition when the current (or instantaneous) electrical power output generated by the turbine assembly falls below the power handling capabilities of the energy storage element(s) and/or the vehicle electrical system as initially configured. In response to the absence, the control module automatically operates the vehicle electrical system to revert to its initial normal operating state. For example, the control module may deactivate or otherwise disable the vehicle electrical components used to dissipate the excess electrical energy, or otherwise prevent those vehicle electrical components from receiving the electrical energy generated by the turbine assembly (e.g., by operating a switching arrangement to decouple the vehicle electrical component(s) from the generator output). Additionally, the control module automatically operates the vehicle electrical system to resume delivery of the electrical energy generated by the turbine assembly to the energy storage element(s), for example, by operating a switching arrangement to provide an electrical connection from the output of the turbine assembly to the energy storage element(s).

It will be appreciated that various embodiments described herein can be combined and utilized to achieve a desired dissipation of excess energy in conjunction with regulating the temperature of the power electronics and the outlet air from the turbine in the throttle loss recovery assembly (and thereby, the engine intake air temperature). Additionally, the electronics assembly may be located in various locations to achieve the needs of a particular application. For example, the electronics assembly 136 may be provided in fluid communication with the input fluid flow 112 upstream of the throttle 106 to expose the electronics assembly 136 to a larger airflow rate for cooling purposes but less energy recovery potential as compared to the embodiment of FIG. 1 where the electronics assembly 136 is in fluid communication with the bypass fluid flow 114, which provides enhanced potential for energy recovery (by better raising the temperature of the input fluid to the turbine) but a lower airflow rate. Similarly, the electronics assembly 136 may be provided in fluid communication with the intake fluid flow 118 downstream of the throttle 106 to expose the electronics assembly 136 to a larger airflow rate for cooling purposes but less effective icing prevention as compared to the embodiment of FIG. 3 where the electronics assembly 136 is in fluid communication with the turbine output fluid flow 116.

For the sake of brevity, conventional techniques related to turbines, turbo generators, throttle loss recovery systems, heat transfer, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:
1. A system comprising:
  a flow control assembly to generate electrical energy in response to a bypass portion of a fluid flow, the bypass portion bypassing a flow control valve based on an orientation of the flow control valve with respect to the fluid flow;

an electrical system coupled to the flow control assembly to receive the electrical energy, the electrical system comprising an energy storage element and an electrical load; and a control module coupled to the electrical system to detect an excess energy condition based at least in part on a characteristic of the electrical system, and to operate the electrical system to dissipate at least a portion of the electrical energy generated by the flow control assembly using the electrical load in response to the excess energy condition.

2. The system of claim 1, wherein the control module operates the electrical system to deliver the electrical energy generated by the flow control assembly to the energy storage element in an absence of the excess energy condition.

3. The system of claim 1, wherein the control module operating the electrical system to dissipate at least the portion of the electrical energy generated by the flow control assembly in response to the excess energy condition comprises:
electrically decoupling the energy storage element from an output of the flow control assembly; and
electrically coupling the electrical load to the output of the flow control assembly.

4. The system of claim 1, wherein the flow control valve is upstream of an intake manifold of an engine of a vehicle.

5. The system of claim 4, wherein:
the energy storage element comprises a vehicle battery;
the electrical load comprises a vehicle electrical component; and
the control module operates the electrical system to charge the vehicle battery with the electrical energy generated by the flow control assembly in an absence of the excess energy condition.

6. The system of claim 5, wherein the control module:
automatically activates the vehicle electrical component to dissipate the portion of the electrical energy generated by the flow control assembly in response to the excess energy condition; and
automatically deactivates the vehicle electrical component in response to the absence of the excess energy condition.

7. The system of claim 6, wherein the control module operates the electrical system to deliver the electrical energy generated by the flow control assembly to the vehicle electrical component in response to the excess energy condition.

8. The system of claim 7, wherein the control module operates the electrical system to prevent delivery of the electrical energy generated by the flow control assembly to the vehicle battery in response to the excess energy condition.

9. The system of claim 6, wherein the control module identifies the vehicle electrical component as a user-enabled vehicle electrical component of a plurality of electrical components onboard the vehicle prior to operating the electrical system to dissipate at least the portion of the electrical energy generated by the flow control assembly using the user-enabled vehicle electrical component in response to the excess energy condition.

10. The system of claim 6, wherein the control module automatically identifies the vehicle electrical component for dissipating the portion of the electrical energy from among a plurality of electrical components onboard the vehicle based on one or more selection criteria prior to operating the electrical system to dissipate at least the portion of the electrical energy generated by the flow control assembly using the vehicle electrical component in response to the excess energy condition.

11. The system of claim 4, wherein:
the electrical load comprises a window defroster of the vehicle; and
the control module automatically activates the window defroster to dissipate the portion of the electrical energy generated by the flow control assembly in response to the excess energy condition.

12. A vehicle system comprising:
a turbine assembly upstream of a throttle to generate electrical energy at an output in response to an input fluid flow influenced by an orientation of the throttle;
a vehicle electrical system coupled to the output of the turbine assembly, the vehicle electrical system including an energy storage element and a vehicle electrical component; and
a control module coupled to the vehicle electrical system to identify an excess energy condition and automatically activate the vehicle electrical component to dissipate at least a portion of the electrical energy generated by the turbine assembly in response to the excess energy condition.

13. The vehicle system of claim 12, wherein after activating the vehicle electrical component, the control module automatically deactivates the vehicle electrical component in an absence of the excess energy condition.

14. The vehicle system of claim 12, wherein the control module automatically activates the vehicle electrical component by activating a switching arrangement coupled between the output of the turbine assembly and the vehicle electrical component.

15. The vehicle system of claim 14, wherein the control module automatically deactivates a second switching arrangement coupled between the output of the turbine assembly and the energy storage element in response to the excess energy condition.

16. A method of managing electrical energy generated by a turbine assembly upstream of a throttle, the turbine assembly generating the electrical energy in response to a fluid flow influenced by an orientation of the throttle, the method comprising:
operating a vehicle electrical system coupled to the turbine assembly to deliver the electrical energy to an energy storage element;
in response to an excess energy condition, operating the vehicle electrical system to dissipate at least a portion of the electrical energy using a vehicle electrical component; and
thereafter, operating the vehicle electrical system to deliver the electrical energy to the energy storage element in response to an absence of the excess energy condition.

17. The method of claim 16, further comprising identifying the excess energy condition based at least in part on a characteristic of the energy storage element.

18. The method of claim 17, further comprising operating the vehicle electrical system to prevent delivery of the electrical energy to the energy storage element in response to the excess energy condition.

19. The method of claim 18, wherein:
operating the vehicle electrical system to dissipate at least the portion of the electrical energy using the vehicle electrical component comprises activating a first switching arrangement coupled between the turbine assembly and the vehicle electrical component; and operating the vehicle electrical system to prevent delivery of the electrical energy to the energy storage element comprises deactivating a second switching arrangement coupled between the turbine assembly and the energy storage element.

20. The method of claim 16, further comprising automatically identifying the vehicle electrical component from among a plurality of vehicle electrical components based on one or more selection criteria.

\* \* \* \* \*